(12) United States Patent
Umehara et al.

(10) Patent No.: US 9,769,220 B2
(45) Date of Patent: Sep. 19, 2017

(54) APPARATUS, SYSTEM, AND METHOD OF CONTROLLING SESSION, AND RECORDING MEDIUM

(71) Applicants: Naoki Umehara, Kanagawa (JP); Takahiro Asai, Kanagawa (JP); Hiroshi Hinohara, Kanagawa (JP)

(72) Inventors: Naoki Umehara, Kanagawa (JP); Takahiro Asai, Kanagawa (JP); Hiroshi Hinohara, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 119 days.

(21) Appl. No.: 14/953,155

(22) Filed: Nov. 27, 2015

(65) Prior Publication Data

US 2016/0149963 A1    May 26, 2016

(30) Foreign Application Priority Data

Nov. 26, 2014    (JP) ................................ 2014-238740

(51) Int. Cl.
| | | |
|---|---|---|
| H04B 7/14 | (2006.01) | |
| H04L 12/28 | (2006.01) | |
| H04L 29/06 | (2006.01) | |
| H04L 12/18 | (2006.01) | |

(Continued)

(52) U.S. Cl.
CPC ...... H04L 65/1069 (2013.01); H04L 12/1818 (2013.01); H04L 65/403 (2013.01); H04M 3/562 (2013.01); H04N 7/15 (2013.01)

(58) Field of Classification Search
CPC ............ H04L 12/1818; H04L 65/1006; H04L 65/1069; H04L 65/1093; H04L 65/403;

(Continued)

(56) References Cited

U.S. PATENT DOCUMENTS

2011/0242971 A1* 10/2011 Kokado ............. H04L 61/2582
370/226
2013/0038676 A1* 2/2013 Tanaka ................ G06F 3/1454
348/14.08

(Continued)

FOREIGN PATENT DOCUMENTS

| JP | 2013-243471 | 12/2013 |
|---|---|---|
| JP | 2015-092651 | 5/2015 |

(Continued)

OTHER PUBLICATIONS

Extended European Search Report issued May 11, 2016 in European Application No. 15196570.4.

*Primary Examiner* — Andrew Chriss
*Assistant Examiner* — Lalita Pace
(74) *Attorney, Agent, or Firm* — Oblon, McClelland, Maier & Neustadt, L.L.P.

(57) ABSTRACT

A control apparatus determines one of a plurality of relay devices as a representative relay device to manage a relay destination of content data in a session to be established. In response to receiving a request for starting relay of content data, from a communication terminal, the control apparatus transmits, with a request for starting relay of content data, relay device identification information for identifying the representative relay device to a relay device connected to the communication terminal, to cause the relay device to further transmit the request for starting relay of content data to the representative relay device identified with the relay device identification information of the representative relay device.

15 Claims, 23 Drawing Sheets

(51) Int. Cl.
*H04M 3/56* (2006.01)
*H04N 7/15* (2006.01)

(58) Field of Classification Search
CPC ............ H04L 65/4038; H04L 65/4046; H04M 3/562; H04M 3/567; H04N 7/15; H04B 7/15; H04B 7/15592; H04B 7/15542; H04Q 2213/13191; H04Q 2213/1324
USPC .......................................................... 370/261
See application file for complete search history.

(56) References Cited

U.S. PATENT DOCUMENTS

| | | | |
|---|---|---|---|
| 2013/0106989 A1* | 5/2013 | Gage | H04N 7/152 348/14.09 |
| 2013/0117373 A1 | 5/2013 | Umehara | |
| 2013/0222528 A1 | 8/2013 | Hinohara et al. | |
| 2013/0242038 A1 | 9/2013 | Umehara et al. | |
| 2014/0078245 A1 | 3/2014 | Umehara et al. | |
| 2014/0137193 A1 | 5/2014 | Inoue | |
| 2014/0321355 A1* | 10/2014 | Choi | H04B 7/15507 370/315 |
| 2015/0077505 A1 | 3/2015 | Umehara | |
| 2015/0092012 A1 | 4/2015 | Umehara | |
| 2015/0130890 A1 | 5/2015 | Umehara | |
| 2015/0138306 A1 | 5/2015 | Umehara | |
| 2016/0212683 A1* | 7/2016 | Freeman | H04B 7/15542 |

FOREIGN PATENT DOCUMENTS

| | | |
|---|---|---|
| WO | WO2005/004481 A1 | 1/2005 |
| WO | WO 2013/172484 A1 | 11/2013 |

\* cited by examiner

FIG. 3

| OPERATING STATE | TERMINAL ID | COUNTERPART TERMINAL |
|---|---|---|
| 📞 | 01bb | BB TERMINAL |
| 📞 | 01cc | CC TERMINAL |
| 💬 | ... | ... |

FIG. 9A

| TERMINAL ID | PASSWORD | SERVICE ID |
|---|---|---|
| 01aa@xx.com | aaaa | VIDEO CONFERENCE |
| 01bb@xx.com | abab | VIDEO CONFERENCE, CLOUD BOARD |
| 01cc@xx.com | baba | VIDEO CONFERENCE, MESSAGE, CLOUD BOARD |
| ... | ... | ... |

FIG. 9B

| TERMINAL ID | COUNTERPART TERMINAL NAME | STATE INFORMATION | IP ADDRESS | AREA ID | RELAY DEVICE ID |
|---|---|---|---|---|---|
| 01aa@xx.com | AA TERMINAL | NONE | 1.2.1.3 | jp01 | 001xx |
| 01bb@xx.com | BB TERMINAL | NONE | 1.2.2.3 | us01 | 001yy |
| 01cc@xx.com | CC TERMINAL | NONE | 1.3.1.3 | sg01 | 001zz |
| ... | ... | ... | ... | ... | ... |

FIG. 9C

| TERMINAL ID | |
|---|---|
| START REQUEST SENDER | COUNTERPART TERMINAL |
| 01aa@xx.com | 01bb@xx.com |
| 01aa@xx.com | 01cc@xx.com |
| ... | ... |
| 01bb@xx.com | 01aa@xx.com |
| ... | ... |

FIG. 9D

| SESSION ID. RELAY DEVICE ID | PARTICIPATION TERMINAL TERMINAL ID |
|---|---|
| conf01.001xx | 01aa@xx.com, 01bb@xx.com, 01cc@xx.com |
| ... | ... |

FIG. 9E

| RELAY DEVICE ID | AREA ID | URI |
|---|---|---|
| 001xx | jp01 | jp01xx.com |
| ... | ... | ... |

FIG. 9F

| TERMINAL ID | OPERATING STATE |
|---|---|
| 01aa@xx.com | ONLINE |
| 01bb@xx.com | ONLINE |
| 01cc@xx.com | ONLINE |
| ... | ... |

FIG. 9G

| TERMINAL ID | RELAY DEVICE CONNECTION ID | RELAY DEVICE CONNECTION PASSWORD |
|---|---|---|
| 01aa@xx.com | v.01.aa | xxxx |
| ... | ... | ... |

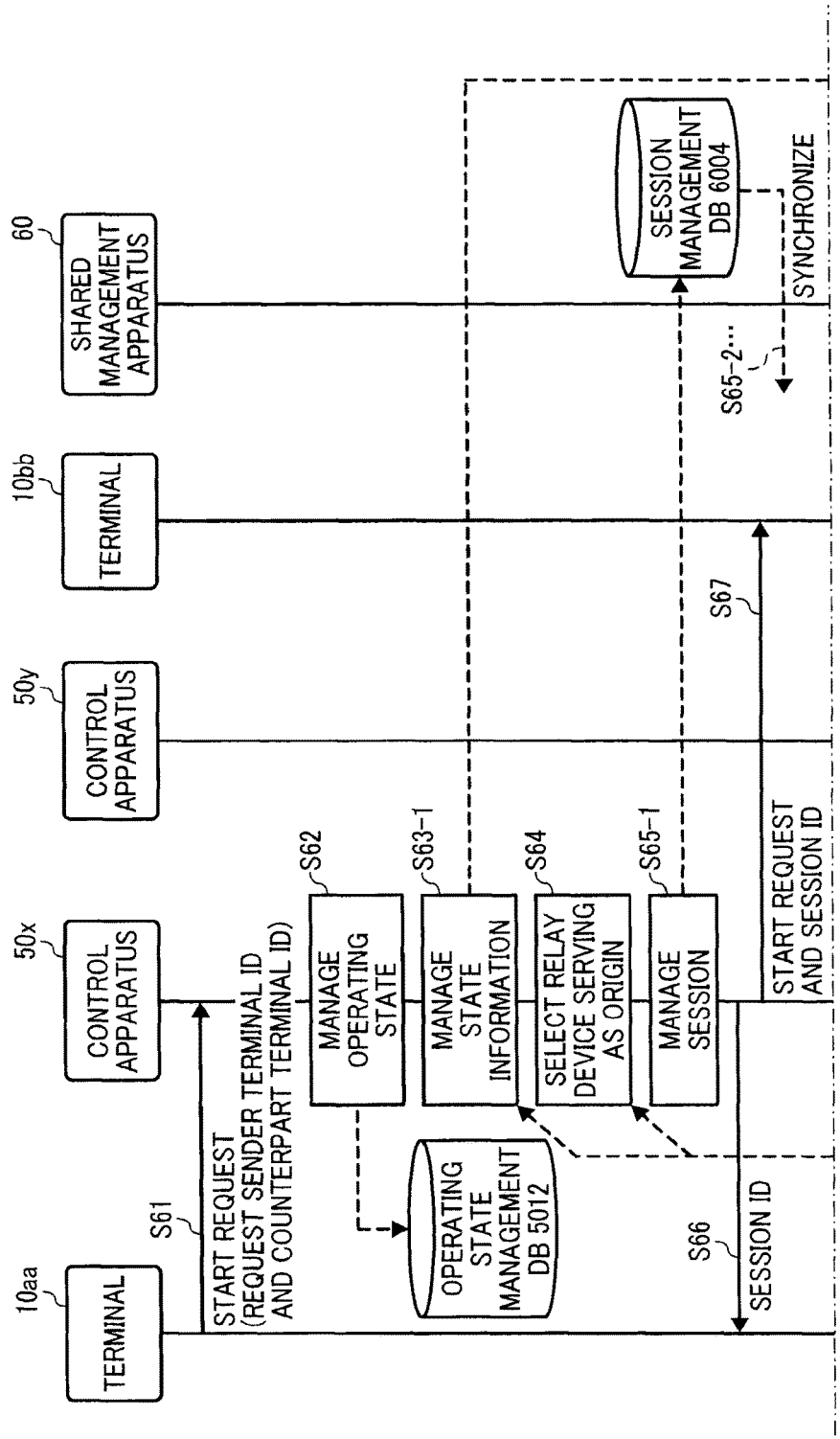

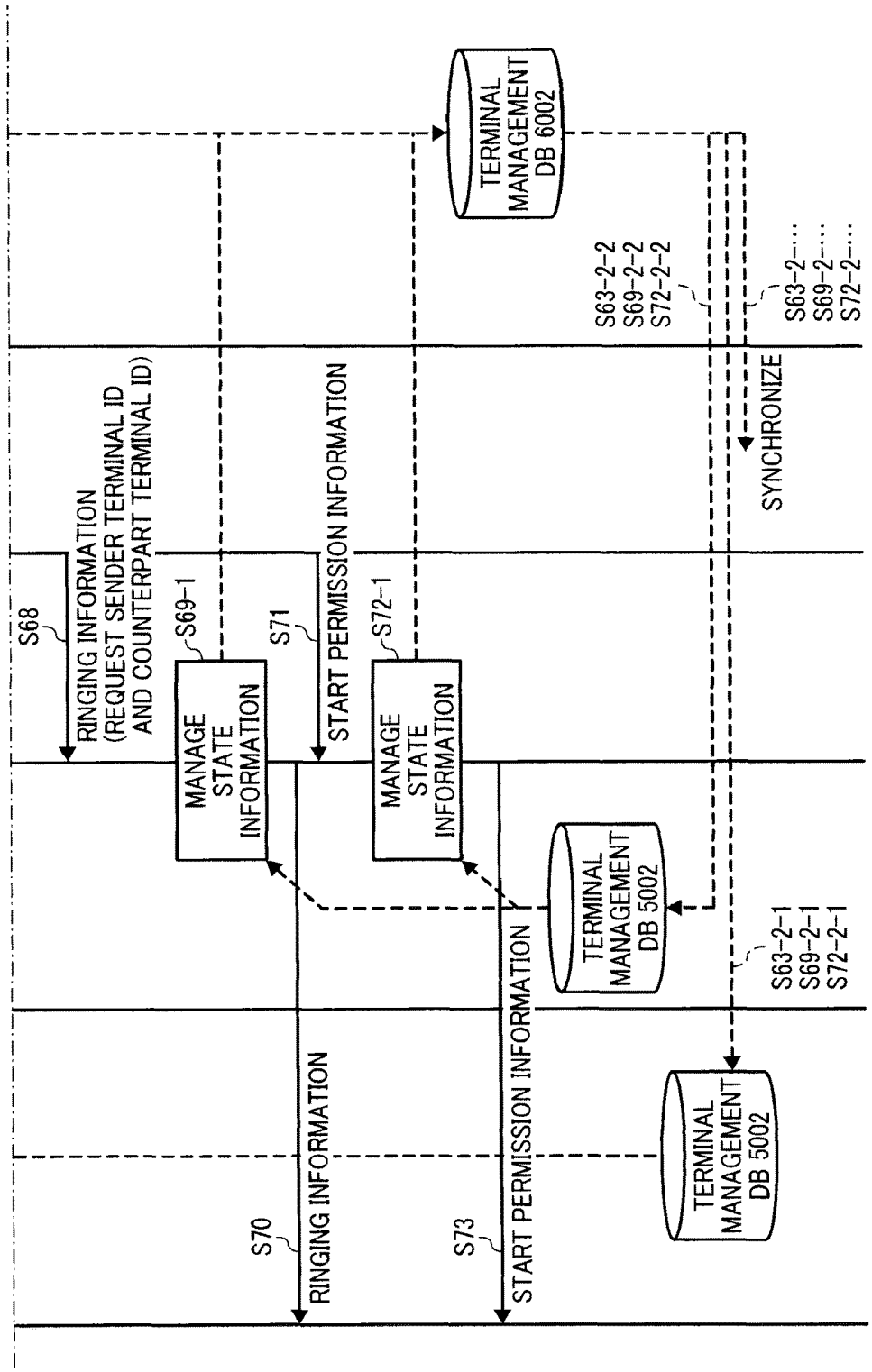

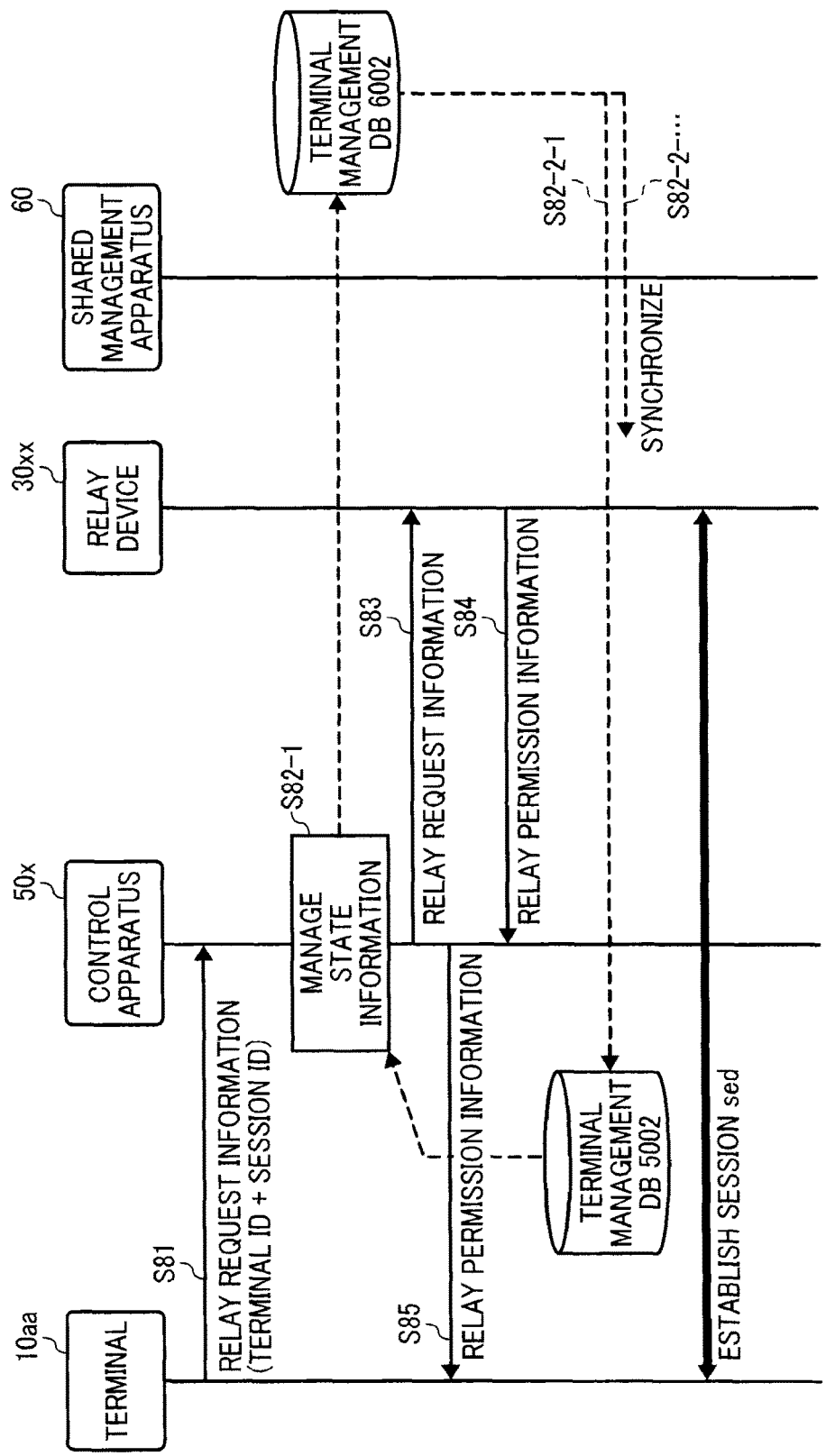

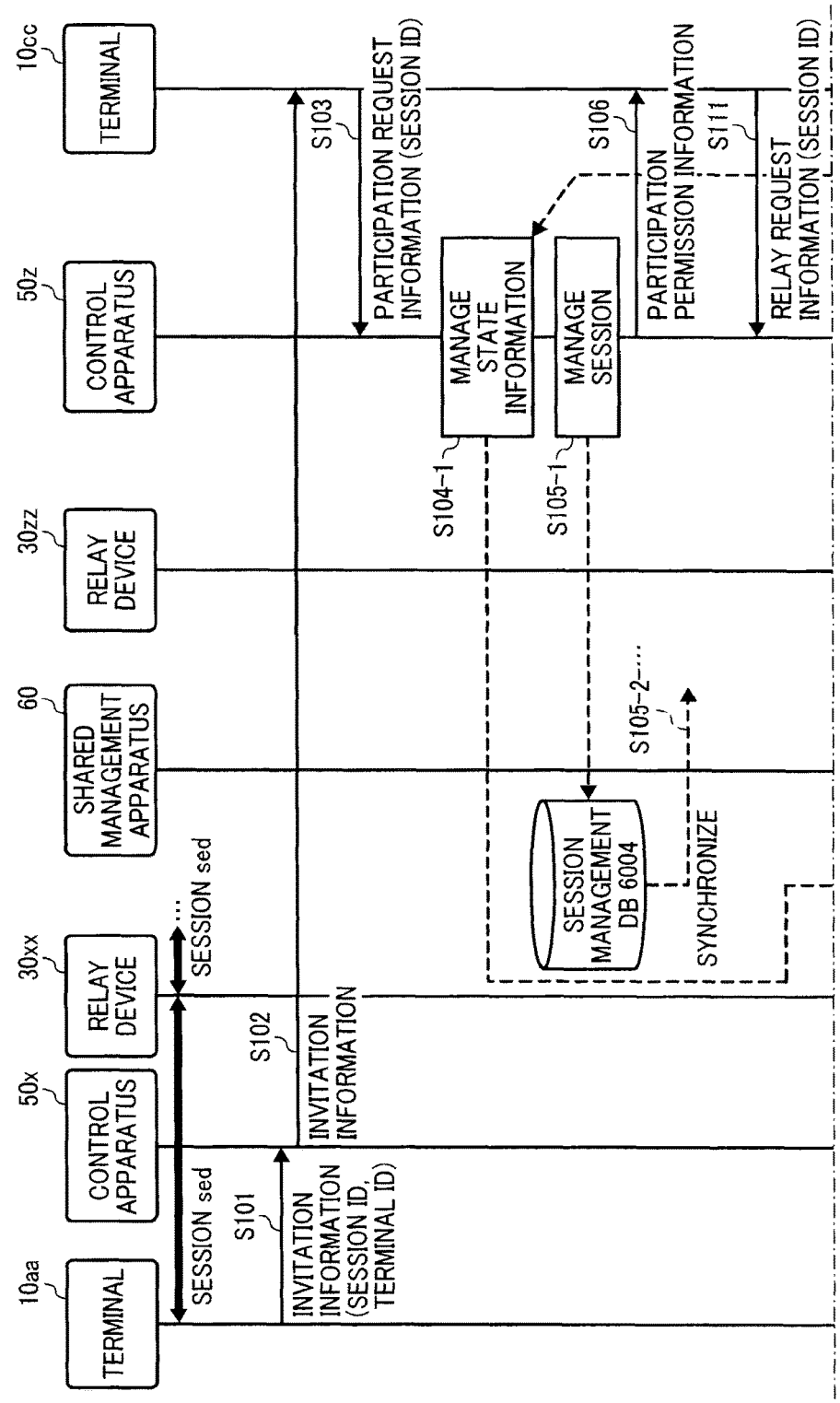

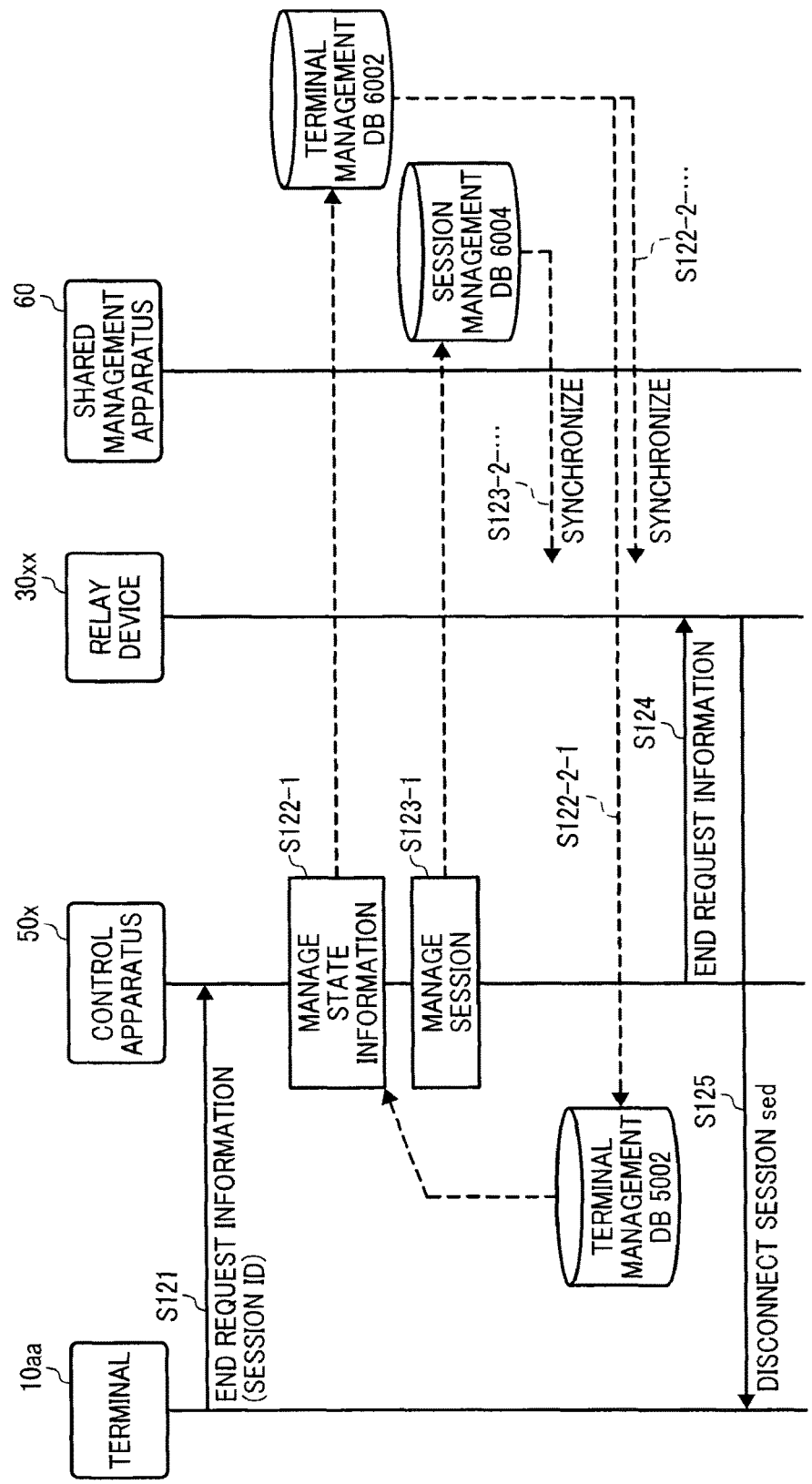

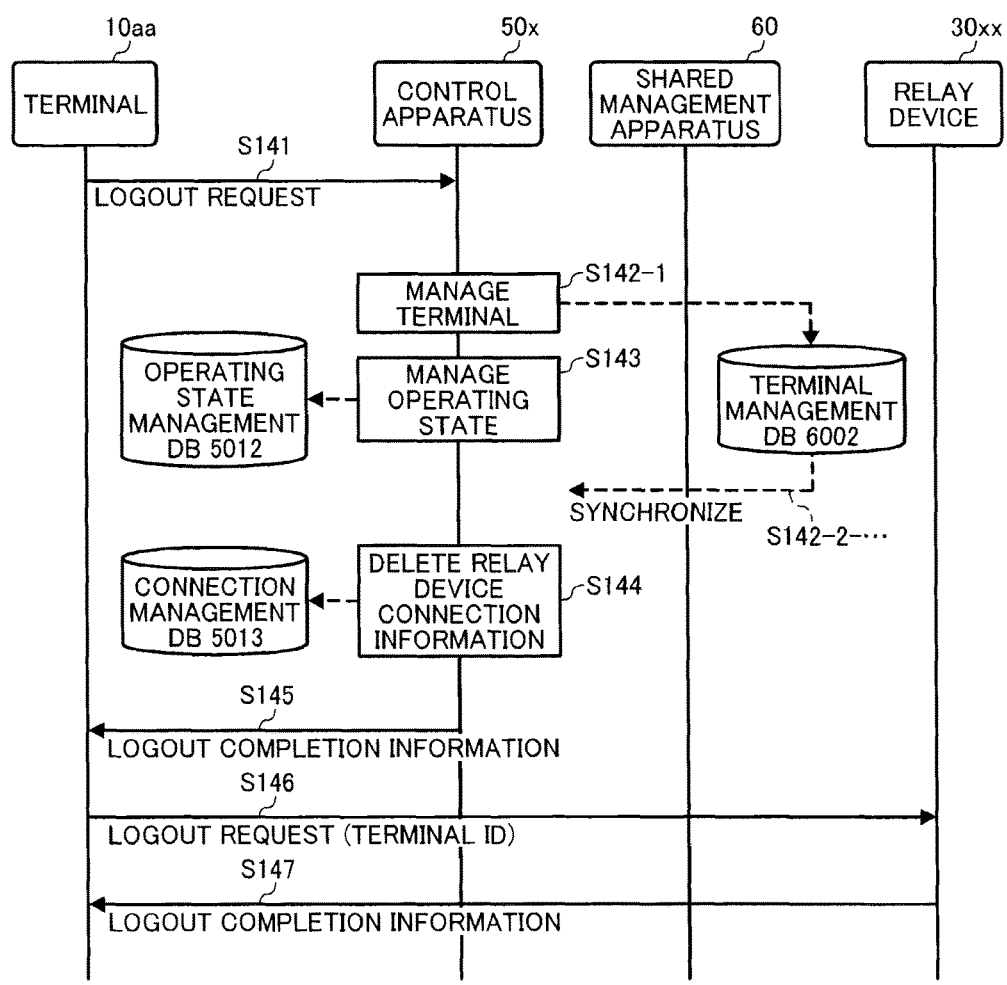

APPARATUS, SYSTEM, AND METHOD OF CONTROLLING SESSION, AND RECORDING MEDIUM

CROSS-REFERENCE TO RELATED APPLICATIONS

This patent application is based on and claims priority pursuant to 35 U.S.C. §119(a) to Japanese Patent Application No. 2014-238740, filed on Nov. 26, 2014, in the Japan Patent Office, the entire disclosure of which is hereby incorporated by reference herein.

BACKGROUND

Technical Field

The present invention relates to an apparatus, system, and method of controlling a session, and a control program stored on a recording medium.

Description of the Related Art

Communication systems such as videoconference systems that perform communication or a conference via a communication network such as the Internet or a dedicated line have become popular in recent years due to a demand for reducing costs and time involved in movement of conference participants. When communication is started between communication terminals in such a communication system, content data such as image data and sound data is transmitted or received, to carry out communication between the participants.

With this wide-spread use, there is a need for scalability in communication systems. For example, as disclosed in Japanese Patent Application Publication No. 2013-243471A, a plurality of videoconference management systems may be provided to disperse a connection destination for the communication terminal. Japanese Patent Application Registration No. 4378651B (corresponding to WO 2005/004481A1) discloses a method of transmitting image data via a plurality of multipoint control units (MCUs) to carry out communication among a plurality of end points. This increases a number of end points that can be connected to one MCU.

SUMMARY

Example embodiments of the present invention include a control apparatus that obtains information regarding a plurality of relay devices for relaying content data in a session to be established among a plurality of communication terminals, and determines one of the plurality of relay devices as a representative relay device to manage a relay destination of content data in the session to be established. In response to receiving a request for starting relay of content data, from a first communication terminal of the plurality of communication terminals subject for participation in the session, the control apparatus transmits, with a request for starting relay of content data, relay device identification information for identifying the representative relay device to a first relay device connected to the first communication terminal, to cause the first relay device to further transmit the request for starting relay of content data to the representative relay device identified with the relay device identification information of the representative relay device.

Example embodiments of the present invention include at least a first control apparatus and a second control apparatus. The first control apparatus obtains information regarding a plurality of relay devices for relaying content data in a session to be established among a plurality of communication terminals, and determines one of the plurality of relay devices as a representative relay device to manage a relay destination of content data in the session to be established. The second control apparatus receives, from a first communication terminal of the plurality of communication terminals subject for participation in the session, a request for starting relay of content data. The second control apparatus further transmits, with a request for starting relay of content data, the relay device identification information of the representative relay device to a first relay device connected to the first communication terminal, to cause the first relay device to further transmit the request for starting relay of content data to the representative relay device identified with the relay device identification information of the representative relay device. For example, the relay device identification information of the representative relay device is transmitted from the first control apparatus to the plurality of communication terminals subject for participation in the session. The first communication terminal may send the relay device identification information of the representative relay device with the request for starting relay of content data.

Example embodiments of the present invention include a method of controlling a session, which may be performed by the control apparatus.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIG. 3 is an illustration of an example of a candidate list;

FIGS. 9A to 9G are illustrations of management tables managed by the control apparatus and the shared management apparatus included in a management system of the communication system of FIG. 1;

FIGS. 13A and 13B are a sequence diagram illustrating operation of transmitting information between the communication terminals, according to an embodiment of the present invention;

FIGS. 14A and 14B are a sequence diagram illustrating operation of starting relaying content data, according to an embodiment of the present invention;

FIGS. 15A and 15B are a sequence diagram illustrating operation of processing a request for participating in a session, according to an embodiment of the present invention;

FIGS. 16A and 16B are a sequence diagram illustrating operation of processing a request for ending the session, according to an embodiment of the present invention; and FIG. 17 is a sequence diagram illustrating logout operation of the communication terminal, according to an embodiment of the present invention.

Figure 1:
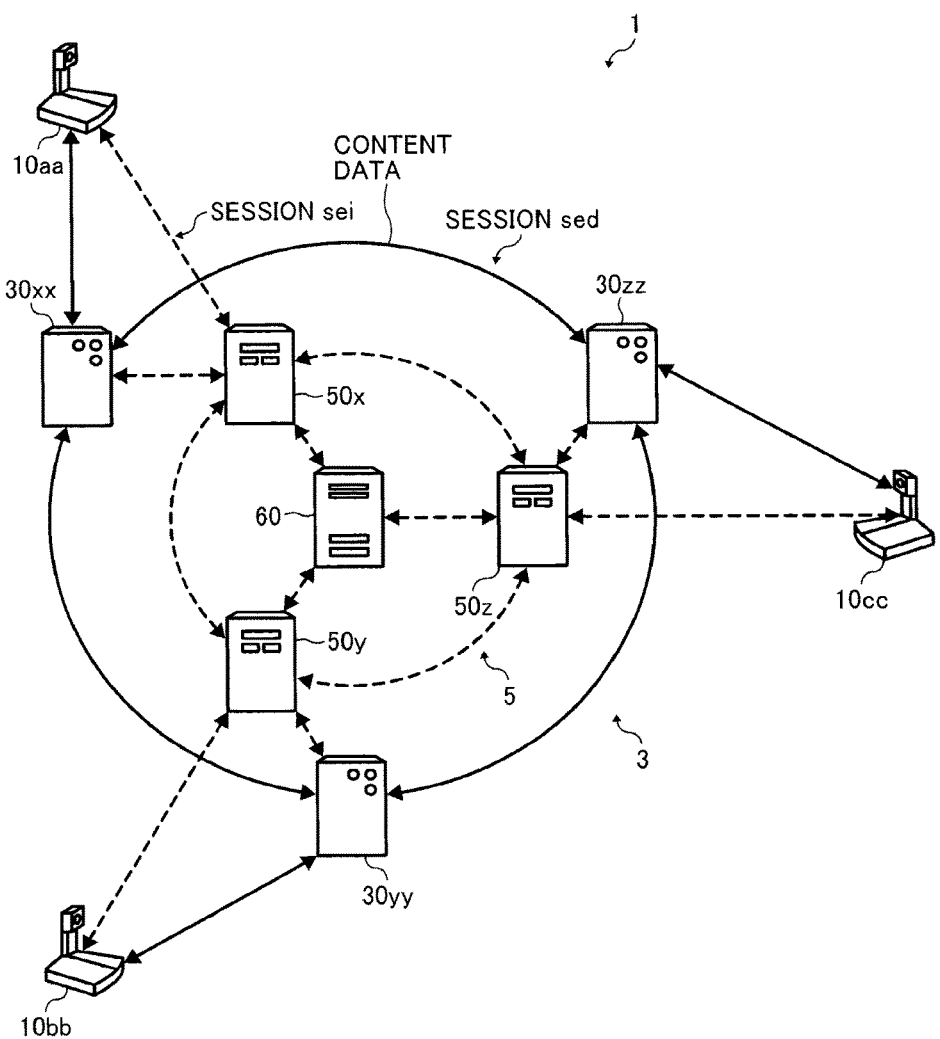
FIG. 1 is a schematic diagram illustrating a communication system according to an embodiment of the present invention.

The accompanying drawings are intended to depict example embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that operate in a similar manner.

In the following description, illustrative embodiments will be described with reference to acts and symbolic representations of operations (e.g., in the form of flowcharts) that may be implemented as program modules or functional processes including routines, programs, objects, components, data structures, etc., that perform particular tasks or implement particular abstract data types and may be implemented using existing hardware at existing network elements or control nodes. Such existing hardware may include one or more Central Processing Units (CPUs), digital signal processors (DSPs), application-specific-integrated-circuits, field programmable gate arrays (FPGAs) computers or the like. These terms in general may be referred to as processors.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Referring to the drawings, an embodiment of the present invention is described.

<Overview of Communication System>

At first, the overview of a communication system 1 according to an embodiment of the present invention will be described using FIG. 1. FIG. 1 is a schematic diagram illustrating a transmission or reception state of various types of information in the communication system 1. Hereinafter, a communication terminal is simply represented as a "terminal".

The communication system 1 according to the embodiment includes a plurality of terminals (10aa, 10bb, and 10cc), a plurality of relay devices (30xx, 30yy, and 30zz), and a control system 5. The control system 5 includes a plurality of control apparatuses (50x, 50y, and 50z), and a shared information management apparatus (shared management apparatus) 60. Hereinafter, an arbitrary one or ones of the plurality of terminals (10aa, 10bb, and 10cc) is/are represented as a "terminal(s) 10". In addition, an arbitrary one or ones of the plurality of relay devices (30xx, 30yy, and 30zz) is/are represented as a "relay device(s) 30". In addition, an arbitrary one or ones of the plurality of control apparatuses (50x, 50y, and 50z) is/are represented as a "control apparatus(s) 50".

The terminal 10 performs communication through transmission or reception of content data. One or more relay devices 30 relay content data between a plurality of terminals 10. In doing so, one or more sessions are established for transmitting one or more items of content data between the plurality of terminals 10. Here, a session for transmitting one or more items of content data is represented as a session sed.

In response to terminals 10 participating in the session sed, content data is exchanged between the terminals 10, to carry out communication between a plurality of offices, communication between different rooms in the same office, communication within the same room, outdoor-indoor communication, or outdoor-outdoor communication. In the case where the terminals 10 are used outside, wireless communication using a mobile phone communication network or the like may be performed.

In this embodiment, the communication system is a system for establishing a session send via a communication management system (corresponding to a "management system") and intercommunicating information, feelings and the like between a plurality of communication terminals (corresponding to "terminals").

In the embodiment, the communication system, the management system, and the terminal will be described while assuming a videoconference system serving as an example of the communication system, a videoconference management system serving as the communication management system, and a videoconference terminal serving as an example of the communication terminal. That is, the terminal and the management system according to the embodiment of the present invention are applied not only to a videoconference system, but also to a communication system. For example, the communication system 1 may be a phone system, and the terminal 10 may be an Internet Protocol (IP) phone, an Internet phone, or a personal computer (PC).

In the embodiment, the term "videoconference" and the term "teleconference" are interchangeably used.

Furthermore, the case in which communication is performed by terminals such as videoconference terminals will be described. However, the embodiment is not limited to this case, and the embodiment is applicable to any case where communication in a broader sense including conversations can be performed. For example, the communication system 1 is applied to the case where an application accesses a server located in a center by itself and transmits or obtains various types of data. In this case, the communication partner may be a server, instead of a terminal. In addition, the terminal includes a game machine, a car navigation apparatus, and the like. The communication system 1 is also an information sharing system, and the terminal 10 may be a projector, an electronic ad (digital signage), or an interactive whiteboard.

In the communication system 1 according to the embodiment, one or more items of content data transmitted between terminals 10 include, for example, four items of data, namely, high-resolution image data, intermediate-resolution image data, low-resolution image data, and sound data. The image data may be a video image or a still image, or both of the video image and the still image. The low-resolution image data serves as a base image and has horizontal 160 pixels by vertical 120 pixels. The intermediate-resolution image data has horizontal 320 pixels by vertical 240 pixels. The high-resolution image data has horizontal 640 pixels by vertical 480 pixels. According to the embodiment, in the case of transmitting content data via a narrowband path between terminals 10, low-quality image data that only includes low-resolution image data serving as a base image is relayed. In the case of transmitting content via a relatively wide band, intermediate-quality image data including low-resolution image data serving as a base image and intermediate-resolution image data is relayed. In addition, in the case of transmitting content data via a very wide band, high-quality image data including low-resolution image data serving as a base image, intermediate-resolution image data, and high-resolution image data is relayed. Since sound data is smaller than image data in data size, the sound data is relayed even in the case of a narrow band path.

In the communication system 1 illustrated in FIG. 1, the plurality of relay devices 30 configure a relay system 3. Although the embodiment where three relay devices 30 relay content data among three terminals 10 is illustrated in FIG. 1, the present invention is not limited thereto. For example, two relay devices 30 may relay content data among three terminals 10, or three relay devices 30 may relay content data between two terminals 10 in the communication system 1.

The shared management apparatus 60 manages information to be shared and used by the control apparatus 50, which includes various types of information regarding terminals 10 or a session sed between the terminals 10 that the control apparatus 50 manages. In this disclosure, such information to be shared is referred to as shared information.

A session for transmitting various types of information is established via the control apparatus 50 between terminals 10. Hereinafter, this session will be represented as a session sei. Various types of information transmitted between terminals 10 include a communication start request, a communication start permission, and a communication end request. The control apparatus 50 can detect the state of each terminal 10 based on various types of information transmitted from the terminal 10.

Figure 2:
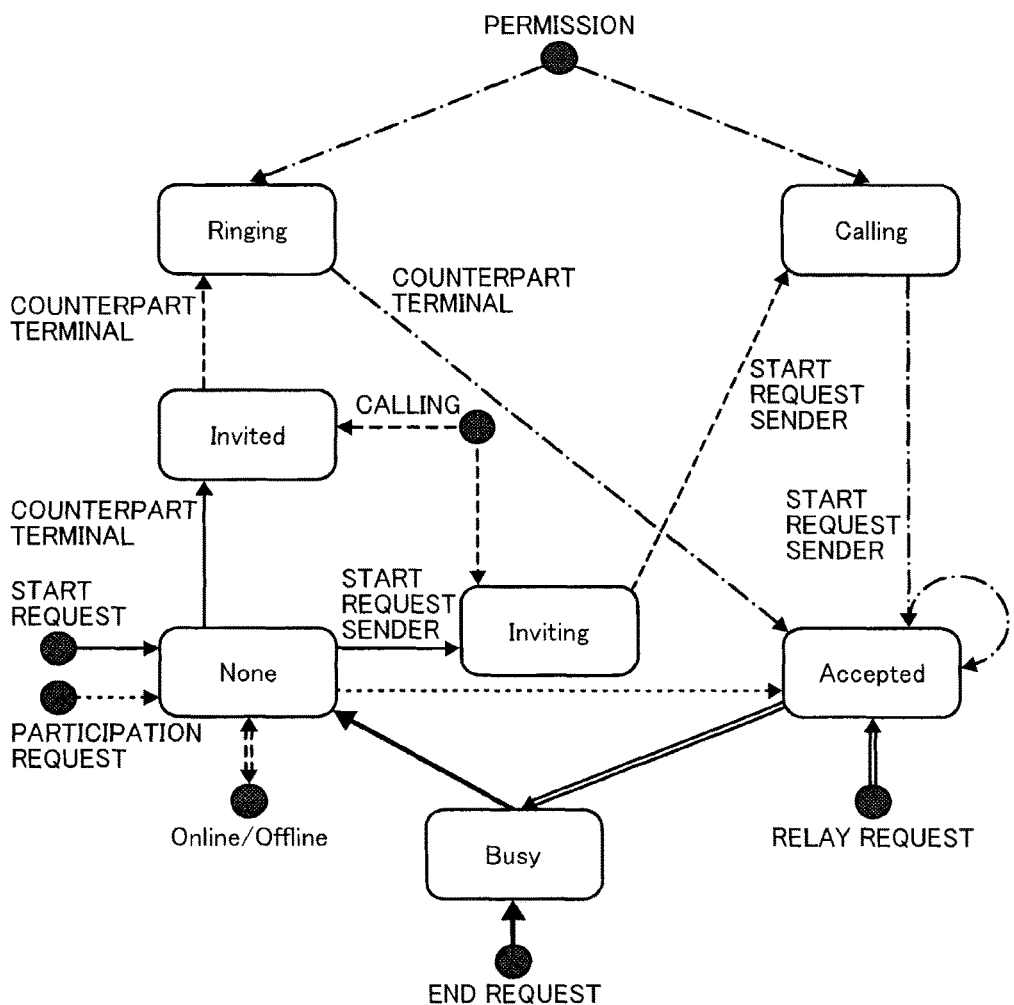
FIG. 2 is a state transition diagram illustrating the state transition of a communication terminal in the communication system of FIG. 1.

FIG. 2 is a state transition diagram illustrating an example of the state transition of a terminal 10. In the state transition diagram of FIG. 2, state information indicating the state of the terminal 10, such as "None", is written in each frame. When the terminal 10 logs in to a control apparatus 50 and becomes online, the communication state of the terminal 10, which has been logged in, becomes a standby state before communication starts (a state indicated by the state information "None"). Next, when the terminal 10 sends a request for starting communication with another terminal 10, the communication state of the terminal 10 that is a start request sender becomes a state requesting to start communication with another terminal 10 (a state indicated by the state information "Inviting"), and the communication state of the other terminal 10 which is a counterpart terminal becomes a state being requested by another terminal 10 to start communication (a state indicated by the state information "Invited"). Next, when the counterpart terminal 10 outputs a ringtone, the communication state of the counterpart terminal 10 becomes a state outputting a ringtone (a state indicated by the state information "Ringing"), and the communication state of the terminal 10 which is the start request sender becomes a state outputting a dial tone (a state indicated by the state information "Calling"). Next, when the counterpart terminal 10 permits the start request, the start request sender terminal 10 and the counterpart terminal 10 enter a state where the start request has been permitted (a state indicated by the state information "Accepted"). Next, when the terminal 10 sends a request to start relaying content data, the communication state of the terminal 10 becomes a communicating state (a state indicated by the state information "Busy"). Next, when the terminal 10 sends a request to end the communication, the communication state of the terminal 10, which is an end request sender, returns to a state indicated by the state information "None". In contrast, in the case where the terminal 10 sends a request to participate in an established session sed, the communication state of the terminal 10, which is a participation request sender, becomes a state indicated by the state information "Accepted". Note that the rules of the above-described state transition are only exemplary, and other rules may be adopted in the communication system 1.

The control apparatus 50 each stores in a memory 5000 information indicating the state transition rules illustrated in the state transition diagram of FIG. 2. Accordingly, for example, when a terminal 10 sends a start request, if the communication state of this start request sender terminal 10 is "None", the control apparatus 50 transmits the start request to a counterpart terminal 10; if the communication state of the start request sender terminal 10 is not "None", the control apparatus 50 rejects the start request, for example. In doing so, the control apparatus 50 can accurately perform calling control between the terminals 10.

In addition, besides the above-described communication state of each terminal 10 subject for management, the control apparatus 50 manages the operating state (presence) of the terminal 10 in order to, for example, notify the user of the terminal 10. Possible types of the operating state of each terminal 10 include the state "online (communication OK)" where the terminal 10 is connected to the control apparatus 50 but is not communicating with another terminal 10, the state "online (communicating)" where the terminal 10 is connected to the control apparatus 50 and is communicating with another terminal 10, and the state "offline" where the terminal 10 is not connected to the control apparatus 50. The control apparatus 50 notifies the terminal 10 connected thereto of the operating state of the terminal 10 that is a candidate counterpart terminal of the notified terminal 10. In response to transmission of the operating state from the control apparatus 50 to the terminal 10, a display control 17 (FIG. 8) updates, based on the transmitted operating state, an icon indicating an operating state displayed in a candidate list (see FIG. 3).

<Hardware Configuration of Communication System>

Figure 4:
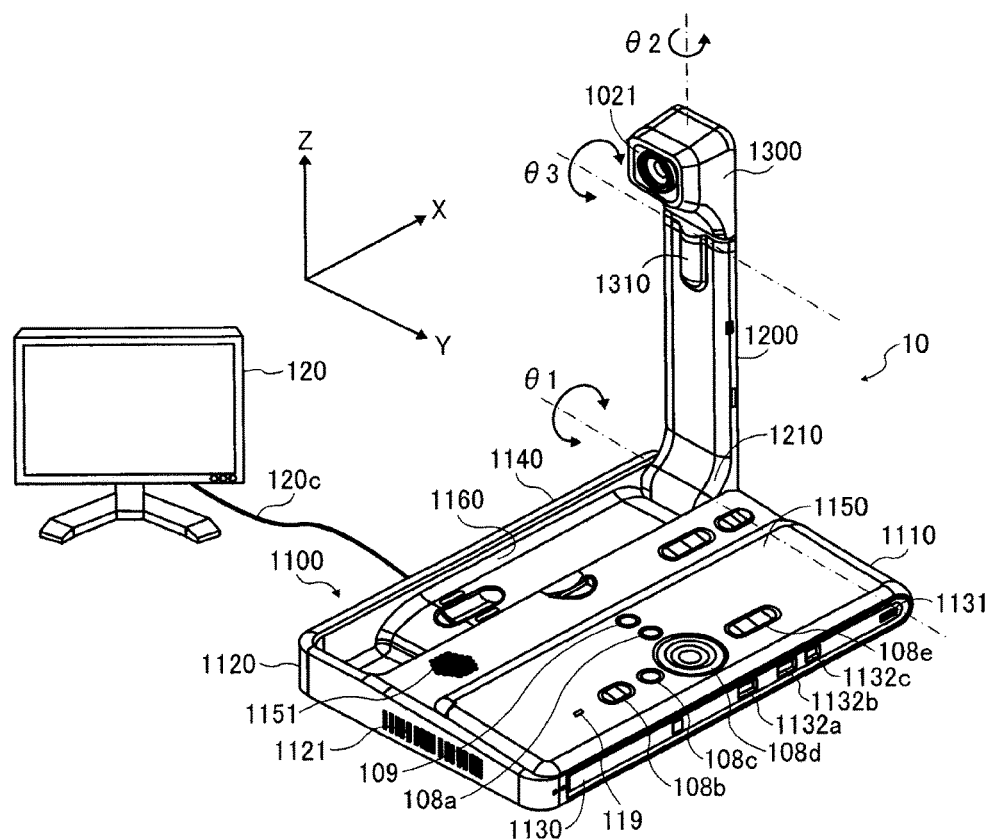
FIG. 4 is a perspective view illustrating an external view of the communication terminal of the communication system of FIG. 1 according to the embodiment of the present invention.

Now, a hardware configuration of the communication system 1 is described. FIG. 4 is a perspective view illustrating an external view of the communication terminal 10 of the communication system 1 of FIG. 1. As illustrated in FIG. 4, the communication terminal 10 includes a casing 1100, an arm 1200, and a camera housing 1300. The casing 1100 has a front wall 1110 provided with an inlet face including a plurality of inlet holes, and a back wall 1120 having an exhaust face 1121 on which a plurality of exhaust holes is formed. As a cooling fan included in the casing 1100 is driven, air behind the communication terminal 10 can be taken in via the inlet face and exhausted to the rear of the communication terminal 10 via the exhaust face 1121. A right-side wall 1130 of the casing 1100 has a sound pickup hole 1131 formed thereon, and a built-in microphone 114, described later, is capable of picking up sound such as sound, noise, or vibration.

An operation panel 1150 is formed toward the right-side wall 1130 of the casing 1100. The operation panel 1150 has a plurality of operation keys (108a to 108e) described later, a power switch 109, and an alarm lamp 119, which are formed thereon. The operation panel 1150 further has a sound output face 1151 formed thereon, which is formed of a plurality of sound output holes for allowing output sound from a built-in speaker 115 to pass through. In addition, an accommodation portion 1160 serving as a recess for accommodating the arm 1200 and the camera housing 1300 is formed toward a left-side wall 1140 of the casing 1100. A plurality of connection ports (1132a to 1132c) for electrically connecting cables to an external device connection interface (I/F) 118 is provided on the right-side wall 1130 of the casing 1100. In contrast, a connection port for electrically connecting a cable 120c for a display 120 to the external device connection I/F 118 is provided toward the left-side wall 1140 of the casing 1100.

The following description uses the term "operation key(s) 108" for indicating an arbitrary one or ones of the operation keys (108a to 108e), and the term "connection port(s) 1132" for indicating an arbitrary one or ones of the connection ports (1132a to 1132c).

The arm 1200 is attached to the casing 1100 via a torque hinge 1210 so as to be rotatable in the vertical direction within the range of a tilt angle θ1 of 135 degrees with respect to the casing 1100. FIG. 4 illustrates a state in which the tilt angle θ1 is 90 degrees. The camera housing 1300 has a built-in camera 112 provided thereon, which can capture an image of a user, a document, a room, or the like. The camera housing 1300 is formed with a torque hinge 1310. The camera housing 1300 is attached to the arm 1200 via the torque hinge 1310 so as to be rotatable in the vertical and horizontal directions within the range of a pan angle θ2 of ±180 degrees and a tilt angle θ3 of ±45 degrees with respect to the arm 1200, in which the state illustrated in FIG. 4 serves as 0 degrees.

Note that the external view illustrated in FIG. 4 is only exemplary and the appearance is not restricted thereto. The communication terminal 10 may be a general-purpose PC, smart phone, or tablet. The camera 112 and the microphone 114 need not necessarily be built-in devices and may be external devices.

Since the relay device 30, the control apparatus 50, and the shared management apparatus 60 each have the same appearance as that of a general server computer, a description of the appearance thereof is omitted.

Figure 5:
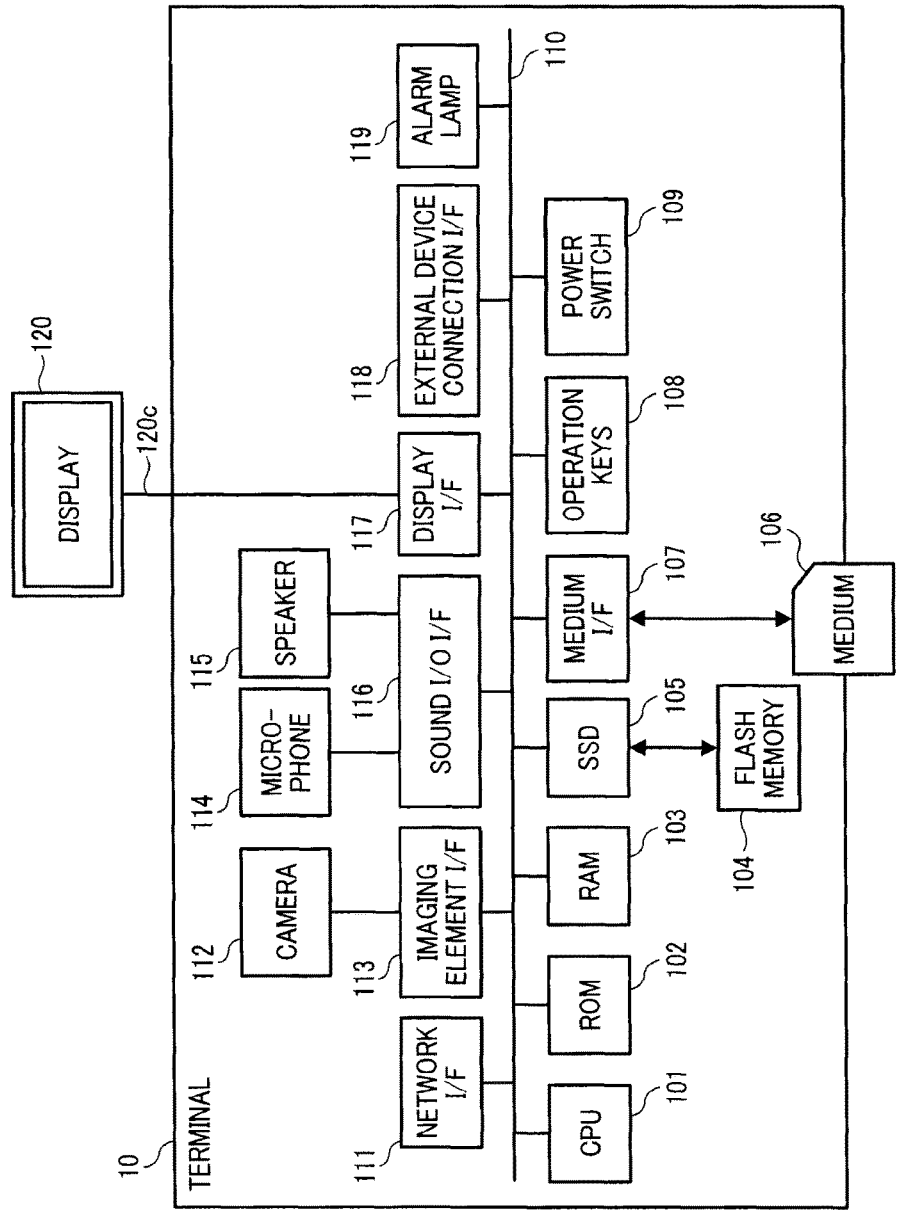
FIG. 5 is a schematic block diagram illustrating a hardware configuration of the communication terminal of FIG. 4 according to the embodiment of the present invention.

FIG. 5 is a schematic block diagram illustrating a hardware configuration of the communication terminal 10. As illustrated in FIG. 5, the communication terminal 10 of the embodiment includes a central processing unit (CPU) 101 that controls entire operation of the communication terminal 10, a read only memory (ROM) 102 that stores a program for operating the CPU 101 such as an initial program loader (IPL), a random access memory (RAM) 103 that operates as a work area for the CPU 101, a flash memory 104 that stores various types of data, such as the terminal control program, image data, and sound data, a solid state drive (SSD) 105 that controls reading/writing of various types of data from/to the flash memory 104 under control of the CPU 101, a medium I/F 107 that controls reading/writing (storage) of data from/to a recording medium 106, the operation key 108 operated in the case of, for example, selecting a counterpart terminal of the communication terminal 10, the power switch 109 for turning on/off the power of the communication terminal 10, and a network interface (I/F) 111 for transmitting data using the communication network 2.

In addition, the communication terminal 10 includes the built-in camera 112, which captures an image of a subject and obtains image data under control of the CPU 101, an imaging element I/F 113 that controls driving of the camera 112, the built-in microphone 114, which receives a sound input, the built-in speaker 115, which outputs sounds, a sound input/output I/F 116 that processes inputting/outputting of a sound signal between the microphone 114 and the speaker 115 under control of the CPU 101, a display I/F 117 that transmits image data to an external display 120 under control of the CPU 101, the external device connection I/F 118 for connecting various external devices, and a bus line 110 such as an address bus and a data bus for electrically connecting the above-described elements as illustrated in FIG. 5.

The display 120 is a display formed of liquid crystal or organic electroluminescence (EL) that displays an image of a subject, an operation icon, or the like. In addition, the display 120 is connected to the display I/F 117 by the cable 120c. The cable 120c may be an analog red green blue (RGB) (video graphic array (VGA)) signal cable, a component video cable, a high-definition multimedia interface (HDMI) signal cable, or a digital video interactive (DVI) signal cable.

The camera 112 includes a lens and a solid-state imaging element that converts an image (video) of a subject to electronic data by converting light to electric charge. As the solid-state imaging element, for example, a complementary metal-oxide-semiconductor (CMOS) or a charge-coupled device (CCD) is used.

The external device connection I/F 118 is capable of connecting an external device such as an external camera, an external microphone, or an external speaker by using a Universal Serial Bus (USB) cable or the like. In the case where an external camera is connected, the external camera is driven in preference to the built-in camera 112 under control of the CPU 101. Similarly, in the case where an external microphone is connected or an external speaker is connected, the external microphone or the external speaker is driven in preference to the built-in microphone 114 or the built-in speaker 115 under control of the CPU 101.

The recording medium 106 is removable from the communication terminal 10. In addition, a non-volatile memory that reads or writes data under control of the CPU 101 is not limited to the flash memory 104, and an electrically erasable and programmable read-only memory (EEPROM) may be used instead.

Figure 6:
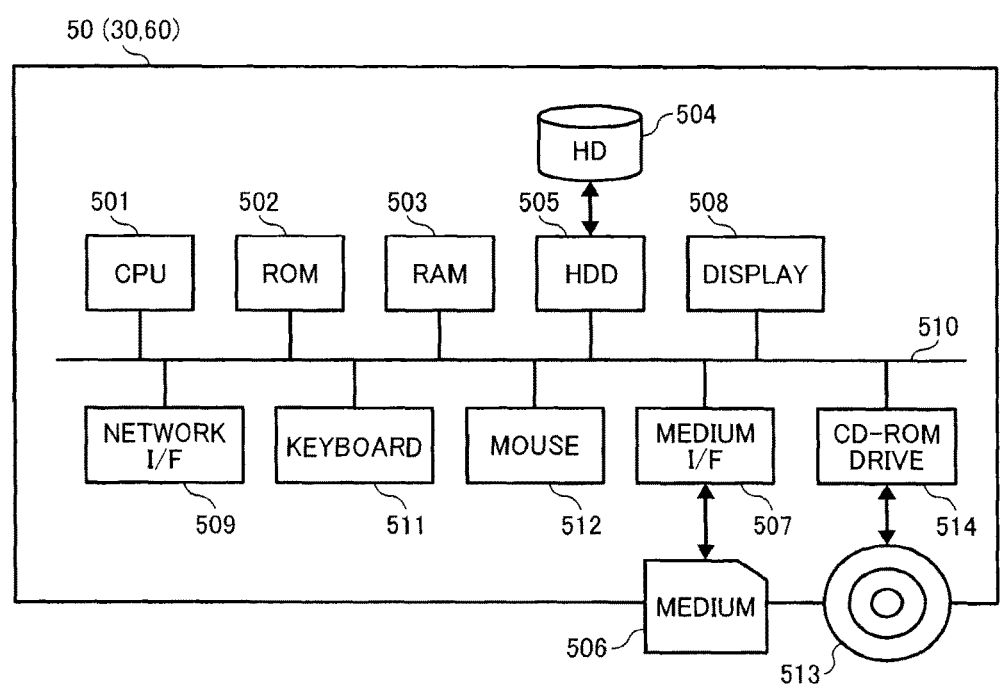
FIG. 6 is a schematic block diagram illustrating a hardware configuration of a control apparatus in the communication system of FIG. 1 according to the embodiment of the present invention.

FIG. 6 is a schematic block diagram illustrating a hardware configuration of the control apparatus 50 according to the embodiment. The control apparatus 50 includes a CPU 501 that controls entire operation of the control apparatus 50, a ROM 502 that stores a program for operating the CPU 501, such as an IPL, a RAM 503 used as a work area for the CPU 501, the HD 504, which stores various types of data, such as the control program for the control apparatus 50, a hard disk drive (HDD) 505 that controls reading/writing of various types of data from/to the HD 504 under control of the CPU 501, a medium drive 507 that controls reading/writing (storage) of data from/to a recording medium 506 such as a flash memory, a display 508 that displays various types of information such as a cursor, a menu, a window, characters, or an image, a network I/F 509 for transmitting data using the communication network 2, a keyboard 511 including a plurality of keys for entering characters, numerals, and various instructions, a mouse 512 that selects and executes various instructions, selects a processing target, and moves the cursor, a compact disc read-only memory (CD-ROM) drive 514 that controls reading/writing of various types of data from/to a CD-ROM 513 serving as an example of a removable recording medium, and a bus line 510 such as an address bus and a data bus for electrically connecting the above-described elements, as illustrated in FIG. 6.

Since the relay device 30 has a hardware configuration that is the same as or similar to that of the above-described control apparatus 50, descriptions thereof are omitted.

Note that the control program for the communication terminal 10, the control program for the relay device 30, the control program for the control apparatus 50, and the control program for the shared management apparatus 60 may each be recorded in a file in a format installable or executable on a computer-readable recording medium for distribution. Examples of such recording medium include, but not limited to, compact disc-recordable (CD-R) and digital versatile disc (DVD). In addition, a memory storing any one of the above-described control programs, such as a recording medium including a CD-ROM or a HDD, may be provided in the form of a program product to users within a certain country or outside that country.

The control apparatus 50 and the shared management apparatus 60 in the above-described embodiment may be configured by a single computer or a plurality of computers to which divided portions (functions) are arbitrarily allocated. The shared management apparatus 60 may be implemented by any one or ones of the plurality of control apparatuses 50 on the communication system 1.

<Overall Configuration of Communication System>

Figure 7:
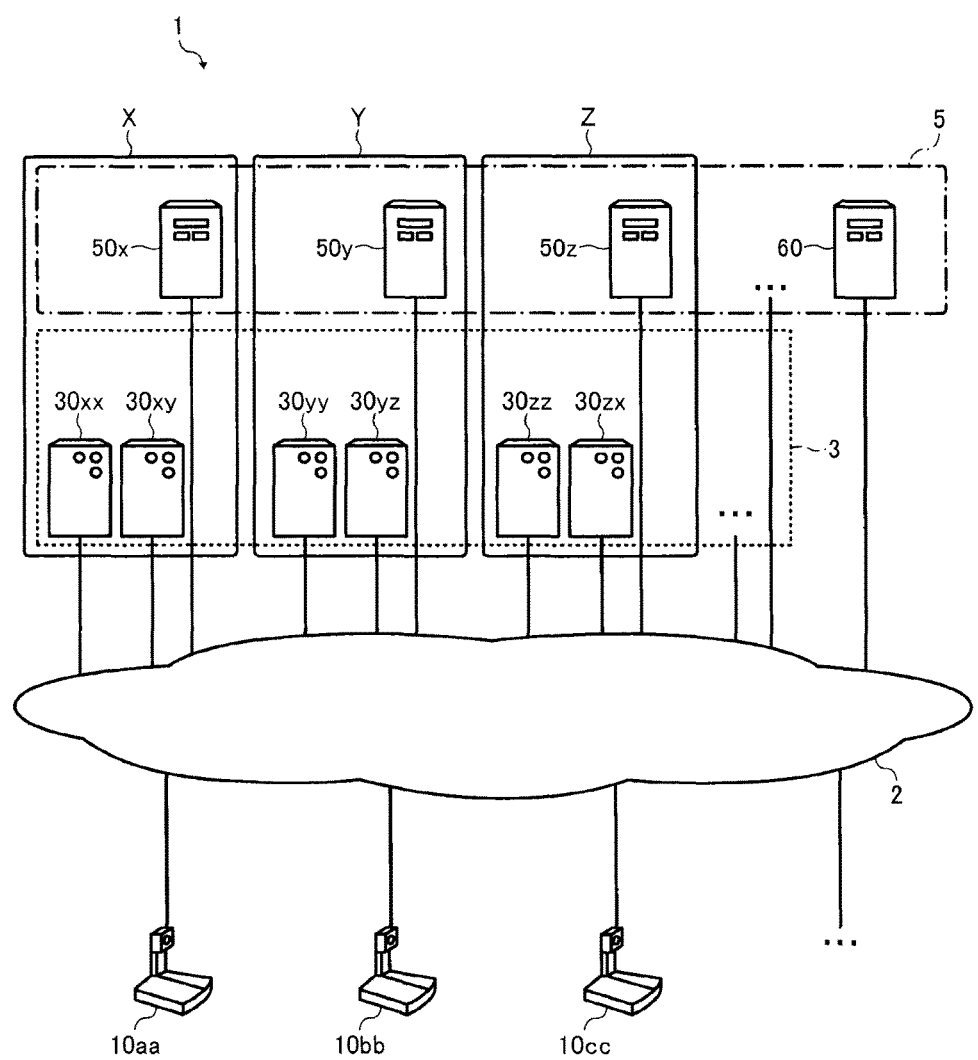
FIG. 7 is an overall configuration diagram of the communication system of FIG. 1 according to the embodiment of the present invention.

Next, using FIG. 7, the overall configuration according to the embodiment will be described. FIG. 7 is an overall configuration diagram of the communication system 1 according to the embodiment of the present invention.

The terminals 10, the relay devices 30, the control apparatuses 50, and the shared management apparatus 60 are connected via the communication network 2 so as to be able to communicate with another terminal, device, or apparatus. The communication network 2 may be a local area network (LAN), the Internet, a mobile phone network, or a dedicated line. Though not particularly limited, for example, communication between the relay devices 30, communication between the control apparatuses 50, or communication between one control apparatus 50 and the shared management apparatus 60 may be carried out through the communication network 2 that is a dedicated line. Accordingly, communication between the devices or apparatuses can be stabilized. In addition, communication via the communication network 2 may include wired communication or wireless communication.

The relay devices ($30xx$ and $30xy$) and the control apparatus $50x$ are located in an area X. For example, the area X is Japan, and the relay devices ($30xx$ and $30xy$) and the control apparatus $50x$ are located in a data center in Tokyo.

The relay devices ($30yy$ and $30yz$) and the control apparatus $50y$ are located in an area Y. For example, the area Y is the United States, and the relay devices ($30yy$ and $30yz$) and the control apparatus $50y$ are located in a data center in New York.

The relay devices ($30zz$ and $30zx$) and the control apparatus $50z$ are located in an area Z. For example, the area Z is Southeast Asia, and the relay devices ($30zz$ and $30zx$) and the control apparatus $50z$ are located in a data center in Singapore.

The terminals ($10aa$, $10bb$, and $10cc$) are each portable, and may connect to the communication network 2 from the respective areas (X, Y, and Z) or from other areas.

In the communication system 1, four or more terminals 10 may be provided. The shared management apparatus 60 may be located in any of the areas (X, Y, and Z), or may be located in an area other than these areas. The relay devices 30 and the control apparatus 50 may be located in areas other than the areas (X, Y, and Z).

<Functional Configuration of Embodiment>

Figure 8:
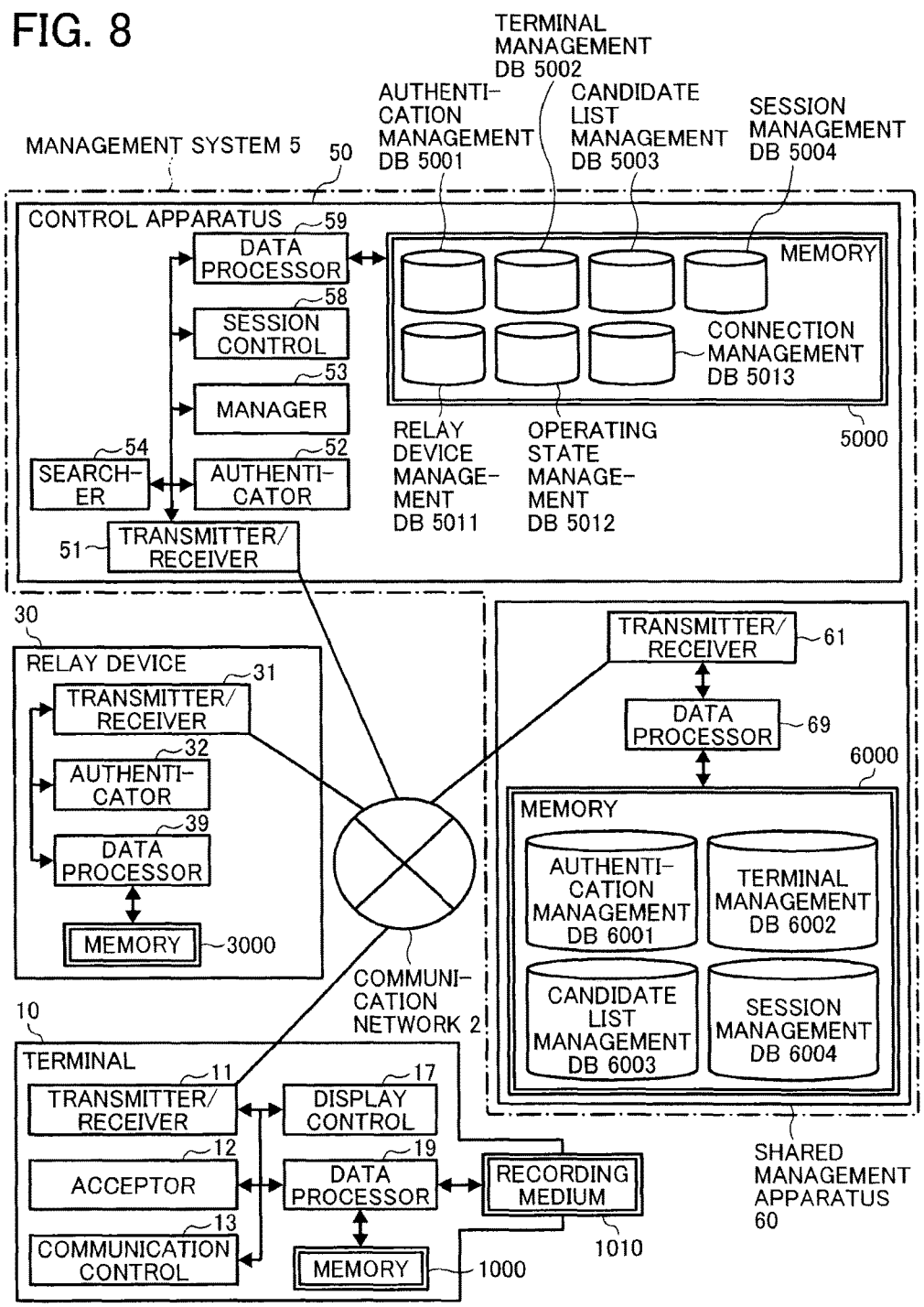
FIG. 8 is a functional block diagram of the communication terminal, a relay device, the control apparatus, and a shared management apparatus of the communication system of FIG. 1.

Referring now to FIGS. 5, 6, and 8, a functional configuration of the communication system 1 of FIG. 1 is described according to the embodiment of the present invention. FIG. 8 is a schematic block diagram illustrating a functional configuration of the communication system 1 of FIG. 1 according to the embodiment of the present invention.

<Functional Configuration of Terminal>

The terminal 10 includes a transmitter/receiver 11, an acceptor 12, a communication control 13, a display control 17, and a data processor 19. These units are functions that are implemented by or that are caused to function by operating any of the elements illustrated in FIG. 5 in cooperation with the instructions of the CPU 101 according to the terminal program expanded from the flash memory 104 to the RAM 103. The terminal 10 further includes a memory 1000 configured by the RAM 103 and the flash memory 104. The terminal 10 is inserted with a recording medium 1010, which is implemented by the recording medium 106. The data processor 19 reads or writes various data from or to the recording medium 1010.

(Functional Configuration of Terminal)

Next, functional configuration of the terminal 10 is explained in detail. In the following description of functional configuration of the terminal 10, relationships of the elements in FIG. 5 with the functional configuration of the terminal 10 in FIG. 5 will also be described.

The transmitter/receiver 11, which is implemented by a command from the CPU 101 and by the network I/F 111, transmits or receives various types of data (or information) to/from another terminal, device, apparatus, or system via the communication network 2.

The acceptor 12, which is implemented by a command from the CPU 101, accepts various inputs such as operation of the operation keys 108 by the user or pressing of the power switch 109 by the user. For example, when the user turns on the power switch 109, the acceptor 12 accepts the power on operation and turns on the power.

The communication control 13, which is implemented by a command from the CPU 101 and by the camera 112 and the imaging element I/F 113, captures an image of a subject and outputs image data obtained by capturing the image. In another example, the communication control 13 is implemented by a command from the CPU 101 and by the sound input/output I/F 116. After the sound of the user is converted to a sound signal by the microphone 114, the communication control 13 receives sound data according to this sound signal. Furthermore, in another example, the communication control 13 is implemented by a command from the CPU 101 and by the sound input/output I/F 116. The communication control 13 outputs a sound signal according to sound data to the speaker 115, and the speaker 115 outputs sound.

The display control 17, which is implemented by a command from the CPU 101 and by the display I/F 117, controls to combine items of received image data having different resolutions and transmit the combined image data to the display 120. The display control 17 can also transmit to the display 120 information received from the control apparatus 50, and display the information on the display 120.

The data processor 19, which is implemented by a command from the CPU 101 and by the SSD 105, or by a command from the CPU 101, performs processing to store various types of data in the memory 1000 or the recording medium 1010 or to read various types of data stored in the memory 1000 or the recording medium 1010. The memory 1000 stores a terminal identification (ID) for identifying each terminal 10, a password, and the like. Alternatively, at least one of the terminal ID and the password may be recorded on the recording medium 1010 and may be read out by the data processor 19. In this case, the recording medium 1010 may be implemented by a subscriber identity module (SIM) card, or Integrated Circuit (IC) card. For example, the user may insert the recording medium 1010 that may be purchased into the terminal 10, to receive communication services from the administrator of the control system 5.

Further, every time image data and sound data are received in performing communication with a counterpart terminal, the memory 1000 overwrites the image data and sound data. The display 120 displays an image based on image data before being overwritten, and the speaker 115 outputs sound based on sound data before being overwritten.

Note that a terminal ID in the embodiment is an example of identification information that is used to uniquely identify a specific terminal 10, such that a language, a character(s), a symbol(s), or various marks are not limited to the above-described embodiment. For example, a combination of at least two of the above-mentioned language, character(s), symbol(s), and various marks may be used as a terminal ID. Instead of a terminal ID, a user ID for identifying the user at the terminal 10 may be used. In such a case, terminal identification information includes not only the terminal ID, but also the user ID.

(Functional Configuration of Control Apparatus)

The control apparatus 50 includes a transmitter/receiver 51, an authenticator 52, a manager 53, a searcher 54, a session control 58, and a data processor 59. These units are functions that are implemented by or that are caused to function by operating any of the elements illustrated in FIG. 6 in cooperation with the instructions of the CPU 501 according to a program for the control apparatus 50, which is expanded from the HD 504 to the RAM 503. In addition, the control apparatus 50 includes a memory 5000 configured by the HD 504.

The memory 5000 of the control apparatus 50 stores the area IDs of areas (X, Y, and Z) where the control apparatus 50 or other control apparatuses 50 are located. For example, the memory 5000 stores the area ID "jp01" indicating Japan where the control apparatus $50x$ is located, the area ID "us01" indicating the U.S. where the control apparatus $50y$ is located, and the area ID "sg01" indicating Singapore where the control apparatus $50z$ is located.

In addition, the memory 5000 stores an authentication management DB 5001 configured by an authentication management table, a terminal management DB 5002 configured by a terminal management table, a candidate list management DB 5003 configured by a candidate list management table, a session management DB 5004 configured by a session management table, a relay device management DB 5011 configured by a relay device management table, an operating state management DB 5012 configured by an operating state management table, and a connection management DB 5013 configured by a connection management table.

(Authentication Management Table)

FIG. 9A is an illustration of an example data structure of the authentication management table. In the authentication management table, a terminal ID for identifying a corresponding terminal 10, a password, and the service ID of a service usable by the terminal 10 are managed in association with one another. The description will be continued by assuming that the terminal IDs of the terminals (10aa, 10bb, and 10cc) are "01aa@xx.com, 01bb@xx.com, and 01cc@xx.com", respectively. Since "@xx.com" included in the terminal IDs are common among the terminals 10, "@xx.com" will be appropriately omitted. Further, while in this example, it is assumed that the service Ill corresponds to a name of application that can be installed for use by the terminal 10, the service Ill may be expressed in any other form such as a symbol uniquely assigned to each application.

(Terminal Management Table)

FIG. 9B is an illustration of an example data structure of the terminal management table. In the terminal management table, for the terminal ID of each terminal 10, a counterpart terminal name (such as a terminal name), state information indicating the communication state of the terminal 10, an IP address indicating the address of the terminal 10, the area ID of a control apparatus 50 serving as a connection destination of the terminal 10, and the relay device ID of a relay device 30 serving as a connection destination of the terminal 10 are managed in association with one another.

(Candidate List Management Table)

FIG. 9C is an illustration of an example data structure of the candidate list management table. In the candidate list management table, for the terminal ID of a terminal 10 serving as a communication start request sender, the terminal IDs of terminals 10 that are candidate counterpart terminals specifiable by the terminal 10 which is the start request sender are associatively managed.

(Session Management Table)

FIG. 9D is an illustration of an example data structure of the session management table. In the session management table, for a session ID for identifying a corresponding session sed, the terminal IDs of terminals 10 participating in the session sed are associatively managed. In the embodiment, in the case of transmitting content data in a session sed via a plurality of relay devices 30 between terminals 10, one relay device 30 manages the whole relaying of content data, and this relay device 30 serves as the origin to provide the other relay device(s) 30 with information indicating a relay destination of the content data, and the like. Therefore, the session ID includes domain information (such as "001xx") indicating a relay device (such as the relay device 30xx) serving as the origin in the session sed. For this reason, the session ID (such as "conf01") is displayed with the relay device ID (such as "001xx").

(Relay Device Management Table)

FIG. 9E is an illustration of an example data structure of the relay device management table. In the relay device management table, for the relay device ID of a relay device 30, the area ID of an area where the relay device 30 is located, and the uniform resource identifier (URI) of the relay device 30 are associatively managed.

(Operating State Management Table)

FIG. 9F is an illustration of an example data structure of the operating state management table. In the operating state management table, for the terminal ID of a terminal 10, the operating state (presence) of the terminal 10 is associatively managed.

(Connection Management Table)

FIG. 9G is an illustration of an example data structure of the connection management table. In the connection management table, for the terminal ID of a terminal 10, a relay device connection ID generated whenever the terminal 10 connects to a relay device 30, and a relay device connection password used in authenticating the terminal 10 when the terminal 10 connects to the relay device 30 are associatively managed.

(Functional Configuration of Control Apparatus)

Next, functional configuration of the control apparatus 50 will be described in detail. In the following description of functional configuration of the control apparatus 50, relationships of the elements in FIG. 6 with the functional configuration of the control apparatus 50 will also be described.

The transmitter/receiver 51, which is implemented by a command from the CPU 501 and by the network I/F 509, transmits or receives various types of data (or information) to/from each terminal, device, apparatus, or system via the communication network 2.

The authenticator 52, which is implemented by a command from the CPU 501, authenticates a terminal 10 by searching the authentication management table (see FIG. 9A) using a terminal ID and a password received by the transmitter/receiver 51 as search keys and determining whether the same terminal ID and the same password are managed in the authentication management table.

The manager 53, which is implemented by a command from the CPU 501, manages each of the above-described management tables by adding or deleting various types of information to or from each management table.

The searcher 54, which is implemented by a command from the CPU 501, searches for a node that is a terminal 10 connected to another control apparatus 50.

The session control 58, which is implemented by a command from the CPU 501, controls a session sed for transmitting content data between terminals 10. The above-mentioned control includes control for establishing a session sed, control for causing terminals 10 to participate in the established session sed, and control for disconnecting the session sed.

The data processor 59, which is implemented by a command from the CPU 501 and by the HDD 505, or by a command from the CPU 501, performs processing to store various types of data in the memory 5000 or to read various types of data stored in the memory 5000.

(Functional Configuration of Shared Management Apparatus)

The shared management apparatus 60 includes a transmitter/receiver 61 and a data processor 69. These units are functions that are implemented by or that are caused to function by operating any of the elements illustrated in FIG. 6 in cooperation with the instructions of the CPU 501 according to the sharing control program expanded from the HD 504 to the RAM 503. In addition, the shared management apparatus 60 includes a memory 6000 configured by the HD 504. The memory 6000 stores an authentication management DB 6001 configured by an authentication management table, a terminal management DB 6002 configured by a terminal management table, a candidate list management DB 6003 configured by a candidate list management table, and a session management DB 6004 configured by a session management table. Note that the authentication management DB 6001, the terminal management DB 6002, the candidate list management DB 6003, and the session management DB 6004 on the shared management apparatus 60 side, and the authentication management DB 5001, the terminal management DB 5002, the candidate list management DB 5003, and the session management DB 5004 on each control apparatus 50 side are synchronized with each other, such that common information are managed.

(Functional Configuration of Shared Management Apparatus)

The transmitter/receiver 61, which is executed by a command from the CPU 501 and by the network I/F 509, transmits or receives various types of data (or information) to/from another terminal, device, apparatus, or system via the communication network 2.

The data processor 69, which is executed by a command from the CPU 501 and by the HDD 505, or by a command from the CPU 501, performs processing to store various types of data in the memory 6000 or to read various types of data stored in the memory 6000.

(Functional Configuration of Relay Device)

The relay device 30 includes a transmitter/receiver 31, an authenticator 32, and a data processor 39. These units are functions that are implemented by or that are caused to function by operating any of the elements illustrated in FIG. 6 in cooperation with the instructions of the CPU 501 according to the relay device program expanded from the HD 504 to the RAM 503. In addition, the relay device 30 includes a memory 3000 configured by the HD 504 illustrated in FIG. 4.

(Functional Configuration of Relay Device)

The transmitter/receiver 31, which is executed by a command from the CPU 501 and by the network I/F 509, transmits or receives various types of data (or information) to/from another terminal, device, apparatus, or system via the communication network 2.

The authenticator 32, which is implemented by a command from the CPU 501, authenticates a terminal 10 by determining whether a combination of a terminal ID, a relay device connection ID, and a relay device connection password received by the transmitter/receiver 31 is managed in the connection management table (see FIG. 9G) on the control apparatus 50 side.

The data processor 39, which is executed by a command from the CPU 501 and by the HDD 505, or by a command from the CPU 501, performs processing to store various types of data in the memory 3000 or to read various types of data stored in the memory 3000.

<Process or Operation of Embodiment>

Next, a process or an operation of the terminal 10, the relay device 30, the control apparatus 50, and the shared management apparatus 60 included in the communication system 1 will be described in detail.

(Login Process)

Figure 10:
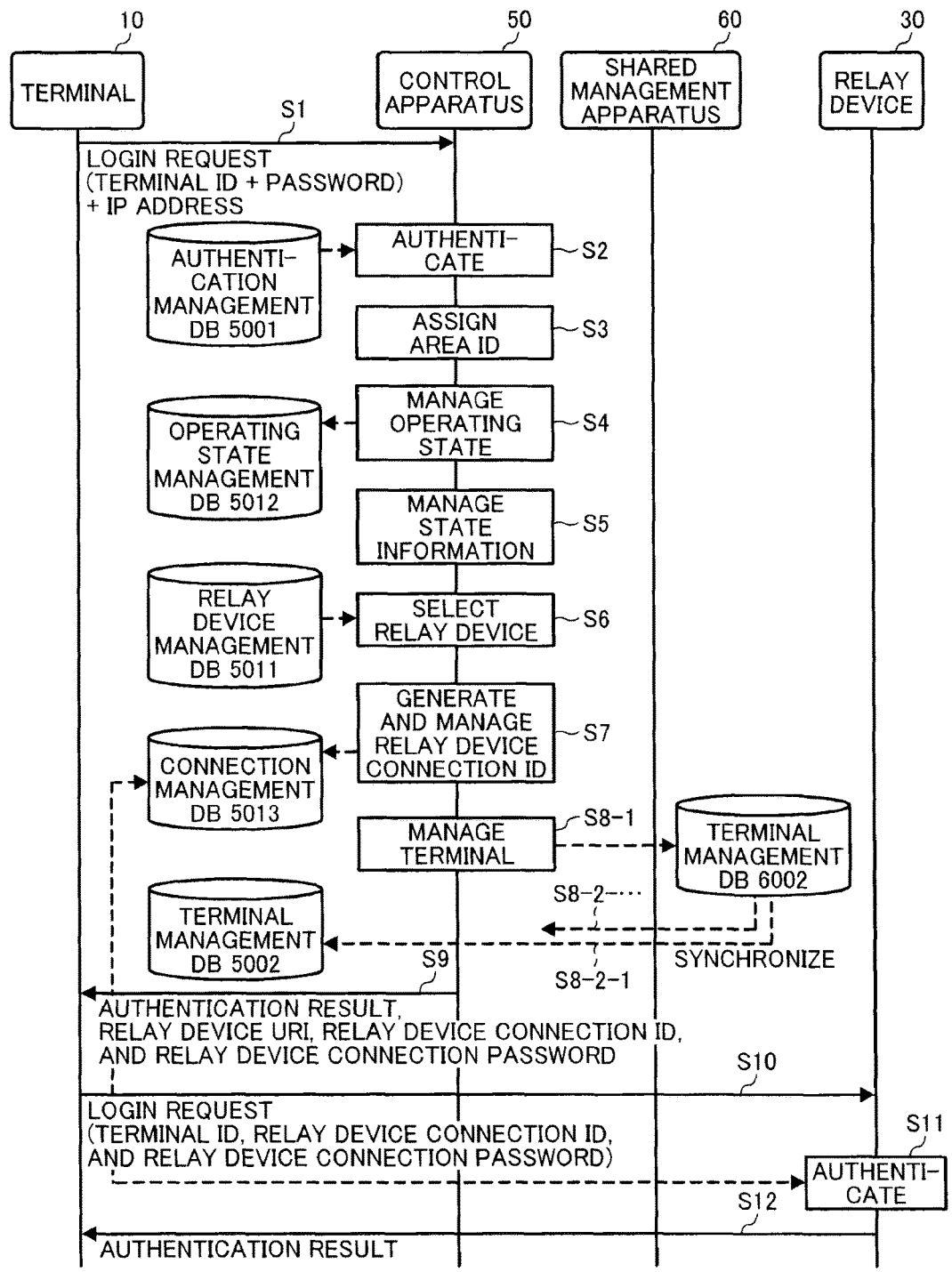
FIG. 10 is a sequence diagram illustrating a login operation of the communication terminal, according to an embodiment of the present invention.

First, using FIG. 10, an operation where a terminal 10 logs in to a control apparatus 50 and to a relay device 30 will be described. FIG. 10 is a sequence diagram illustrating a login operation of the terminal 10.

According to the embodiment of the present invention, a terminal 10 can log in to one arbitrary control apparatus 50 among the plurality of control apparatuses 50. The method of selecting a control apparatus 50 serving as a login request destination of each terminal 10 is not particularly limited. For example, the method of selecting a control apparatus 50 on the basis of information input to a terminal 10, the method of selecting a control apparatus 50 closest to a terminal 10 on the basis of the physical position information on the terminal 10, or the method of selecting a control apparatus 50 using GSLB may be used.

The terminal 10 transmits, by using the transmitter/receiver 11, a login request and its IP address to a selected, arbitrary control apparatus 50 (step S1). The login request includes the terminal ID and password of the terminal 10, which is the login request sender. In response to transmission of a login request from the terminal 10, the IP address of the terminal 10 is transmitted to the control apparatus 50 serving as a login request destination. Accordingly, the transmitter/receiver 51 of the control apparatus 50 receives the login request including the terminal ID and password, and the IP address of the terminal 10.

Next, the authenticator 52 refers to the authentication management table (FIG. 9A) and authenticates the terminal 10, which is the login request sender (step S2). Here, in the case where the same combination as the combination of the terminal ID and password transmitted from the login request sender is managed in the authentication management table, the authenticator 52 successfully authenticates the terminal 10, which is the login request sender. In contrast, in the case where the same combination as the combination of the terminal ID and password transmitted from the login request sender is not managed in the authentication management table, the authenticator 52 fails authentication of the terminal 10, which is the login request sender. Hereinafter, the case of successful authentication will be continuously described.

The data processor 59 searches the authentication management table by using the terminal ID of the terminal 10, which is the login request sender, as a search key, and reads out a corresponding service ID, which is part of processing in step S2.

Next, the manager 53 assigns an area ID indicating an area where the control apparatus 50 is located, to the terminal 10, which is the login request sender (step S3). The area ID is stored in advance in the memory 5000 of the control apparatus 50. For example, if the control apparatus 50 which has accepted the login request is the control apparatus 50x located in the area X (Japan), the manager 53 assigns "jp01" as the area ID to the terminal 10, which is the login request sender.

Next, on the basis of a request from the manager 53, the data processor 59 stores the operating state "online" in association with the terminal ID of the terminal 10, which is the login request sender, in the operating state management table (see FIG. 9F) (step S4).

In addition, the manager 53 manages the communication state of the terminal 10, which is the login request sender, in accordance with the rules of the state transition illustrated by the state transition diagram of FIG. 2 (step S5). That is, in response to the operating state becoming "online" in step S4, the manager 53 determines the state information indicating the new state of the terminal 10, which is the login request sender, as "None" (see FIG. 2).

In the case where the service ID read out in step S2 is "videoconference", the session control 58 selects a relay device 30 serving as a connection destination of the terminal 10, which is the login request sender (step S6). In this case, the session control 58 selects a relay device 30 identified by a relay device ID managed in the session management table in association with the area ID (such as "jp01") of an area (such as the area X) where the control apparatus 50 is located, that is, a relay device 30 located in the same area as the control apparatus 50, as a relay device 30 serving as a connection destination of the terminal 10, which is the login request sender. In the case where a plurality of relay devices 30 are located in the same area as the control apparatus 50, the method of selecting a relay device 30 is not particularly limited. For example, the method may be one that selects a relay device 30 by using round robin, or one that selects a relay device 30 on the basis of the load on each relay device 30. As part of processing in step S6, the data processor 59 searches the relay device management table (see FIG. 9E) by using the relay device ID of the selected relay device 30 as a search key, thereby reading out a corresponding URI.

The session control 58 of the control apparatus 50 also generates a relay device connection ID used by the terminal 10, which is the login request sender, to connect to the relay device 30 selected in step S5 (step S7). As part of processing in step S7, the data processor 59 associates the generated relay device connection ID and a relay device connection password in association with the terminal ID of the terminal 10, which is the login request sender, in the connection management table (see FIG. 9G). Note that the relay device connection password may be determined in advance for each relay device 30, or may be generated whenever a terminal 10 connects to a relay device 30.

The transmitter/receiver 51 of the control apparatus 50 transmits a terminal management table updating request to the shared management apparatus 60 (step S8-1). The updating request includes the terminal ID and IP address of the terminal 10, which is the login request sender, the area ID assigned in step S3, the state information determined in step S5, and the relay device ID of the relay device 30 selected in step S6. Upon receipt, by the transmitter/receiver 61 of the shared management apparatus 60, of the updating request, the data processor 69 associatively stores the terminal ID, IP address, state information, area ID, and relay device ID, which are included in the updating request, in the terminal management table (see FIG. 9B) on the shared management apparatus 60 side.

Thereafter, the transmitter/receiver 61 of the shared management apparatus 60 transmits the updated details of the terminal management table including the terminal ID, state information, area ID, relay device ID, and so forth to each of the control apparatuses (50x, 50y, and 50z) included in the communication system 1. Upon receipt, by the transmitter/receiver 51 of each control apparatus (50x, 50y, and 50z), of the updated details, the data processor 59 of each control apparatus 50 updates the terminal management table therein on the basis of the received updated details. Accordingly, the terminal management table on each control apparatus (50x, 50y, and 50z) side is synchronized with the terminal management table on the shared management apparatus 60 side (steps S8-2-1, S8-2- . . . ).

Next, the transmitter/receiver 51 of the control apparatus 50 transmits, to the terminal 10, which is the login request sender, the authentication result indicating successful authentication, the URI of the relay device 30 read out in step S6, the relay device connection ID generated in step S7, and the relay device connection password (step S9).

Upon receipt, by the transmitter/receiver 11 of the terminal 10, of the URI, relay device connection ID, and relay device connection password transmitted from the control apparatus 50, the transmitter/receiver 11 transmits a login request to the relay device 30 indicated by the URI (step S10). The login request includes the terminal ID of the terminal 10, which is the login request sender, and the relay device connection ID and the relay device connection password, which are transmitted from the control apparatus 50.

In the relay device 30, which has received the login request, the authenticator 32 authenticates the terminal 10, which is the login request sender (step S11). In this case, the authenticator 32 sends, via the transmitter/receiver 31, an inquiry to the control apparatus 50 located in the same area as the relay device 30, as to whether the same combination as the combination of the terminal ID, relay device connection ID, and relay device connection password included in the login request is managed in the connection management table (see FIG. 9G) on the control apparatus 50 side. On the control apparatus 50 side, which has received the inquiry, the manager 53 refers to the connection management table and transmits the inquiry result to the relay device 30 via the transmitter/receiver 51. In the case where the same combination as the combination of the terminal ID, relay device connection ID, and relay device connection password included in the login request is managed in the connection management table on the control apparatus 50 side, the authenticator 32 successfully authenticates the terminal 10, which is the login request sender. In contrast, in the case where the same combination as the combination of the terminal ID, relay device connection ID, and relay device connection password included in the login request is not managed in the connection management table on the control apparatus 50 side, the authenticator 32 fails authentication of the terminal 10, which is the login request sender. The transmitter/receiver 31 of the relay device 30 transmits the authentication result to the terminal 10, which is the login request sender (step S12).

Hereinafter, the case of successful authentication will be continuously described.

(Candidate List Request)

Figure 11:
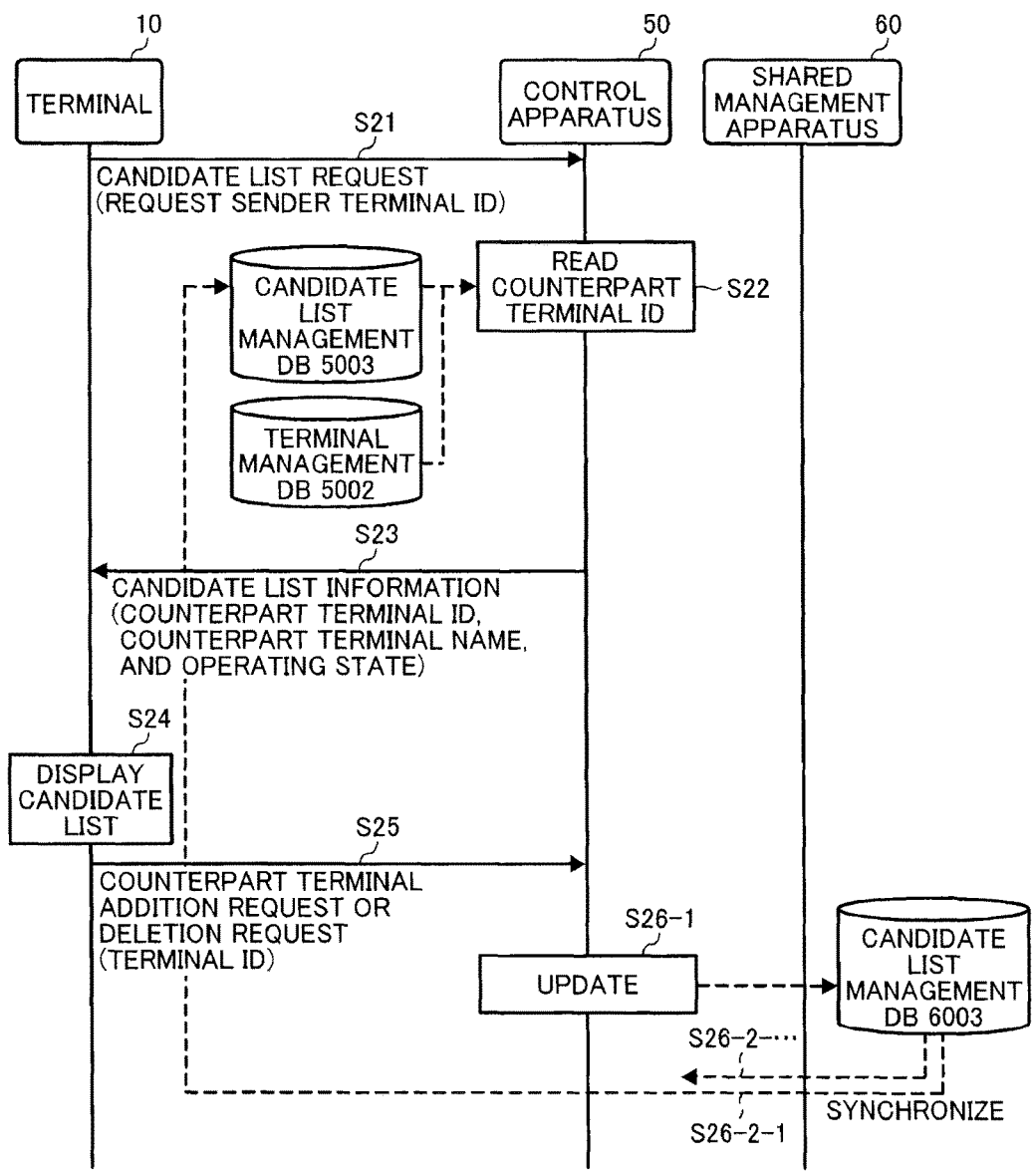
FIG. 11 is a sequence diagram illustrating operation of displaying a candidate list on the communication terminal, according to an embodiment of the present invention.

Next, using FIG. 11, an operation until a candidate list indicating candidate counterpart terminals of the terminal 10 is displayed on the terminal 10 will be described. FIG. 11 is a sequence diagram illustrating an operation of displaying a candidate list on the terminal 10. In response to reception of the authentication result by the terminal 10, the transmitter/receiver 11 transmits a candidate list request that includes the terminal ID of the terminal 10 and that indicates a request for a candidate list to the control apparatus 50 via the communication network 2 (step S21). Accordingly, the transmitter/receiver 51 of the control apparatus 50 receives the candidate list request.

Next, the data processor 59 searches the candidate list management table (see FIG. 9C) by using the terminal ID of the terminal 10, which is the candidate list request sender, as a search key and extracts the terminal ID of a terminal 10 serving as a candidate counterpart terminal that can be specified as a counterpart terminal by the terminal 10, which is the candidate list request sender (step S22). In addition, the data processor 59 searches the terminal management table (see FIG. 9B) by using the extracted terminal ID as a search key, and reads out a counterpart terminal name. The transmitter/receiver 51 of the control apparatus 50 transmits the terminal ID and counterpart terminal name of each candidate counterpart terminal, read out by the data processor 59, to the terminal 10, which is the candidate list request sender (step S23).

Upon receipt of candidate list information by the transmitter/receiver 11 of the terminal 10, which is the candidate list request sender, the display control 17 of the terminal 10 displays, on the display 120, a candidate list reflecting each specifiable candidate counterpart terminal name, on the basis of the terminal ID(s) and counterpart terminal name(s) included in the candidate list information (see FIG. 3) (step S24).

According to the embodiment of the present invention, in the case of adding a candidate counterpart terminal to the candidate list or deleting a candidate counterpart terminal from the candidate list, the terminal 10 transmits a candidate list management table updating request including the terminal ID of a terminal 10 serving as a candidate counterpart terminal to be added or deleted, and the terminal ID of the terminal 10, to the control apparatus 50 (step S25). In the control apparatus 50 which has received the updating request, on the basis of a request from the manager 53, the transmitter/receiver 51 transmits a candidate list management table updating request to the shared management apparatus 60 (step S26-1). This updating request includes the terminal ID of the terminal 10, which is the updating request sender, and the terminal ID of a terminal 10 that is a candidate counterpart terminal to be added or deleted. The data processor 69 of the shared management apparatus 60 adds, as the terminal ID of a candidate counterpart terminal associated with the terminal ID of the terminal 10, which is the updating request sender, the terminal ID of a candidate counterpart terminal to be added, which is included in the updating request, in the candidate list management table. Alternatively, the data processor 69 of the shared management apparatus 60 deletes, among the terminal ID(s) of a candidate counterpart terminal(s) associated with the terminal ID of the terminal 10, which is the updating request sender, the terminal ID of a candidate counterpart terminal to be deleted, which is included in the updating request, from the candidate list management table.

Thereafter, the transmitter/receiver 61 of the shared management apparatus 60 transmits the updated details of the candidate list management table to each control apparatus (50x, 50y, and 50z) included in the communication system 1. Upon receipt of the updated details by the transmitter/receiver 51 of each control apparatus (50x, 50y, and 50z), the data processor 59 of each control apparatus 50 updates the candidate list management table therein on the basis of the received updated details. Accordingly, the candidate list management table on each control apparatus (50x, 50y, and 50z) side is synchronized with the candidate list management table on the shared management apparatus 60 side (steps S26-2-1, S26-2-2, . . . ).

(Operating State Management)

Figure 12A:
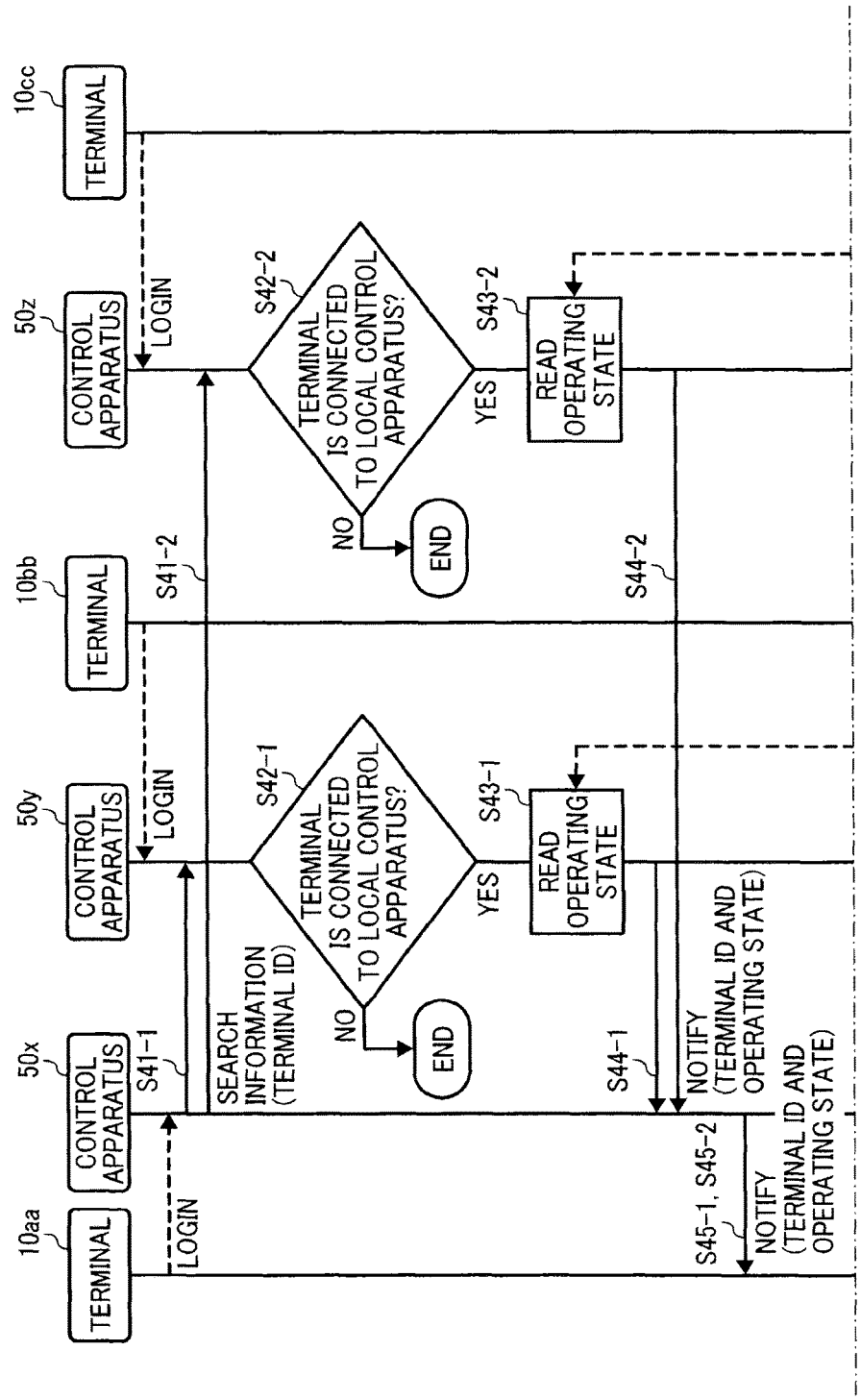
FIGS. 12A and 12B are a sequence diagram illustrating operation of synchronizing operating states among control apparatuses, according to an embodiment of the present invention.
Figure 12B:
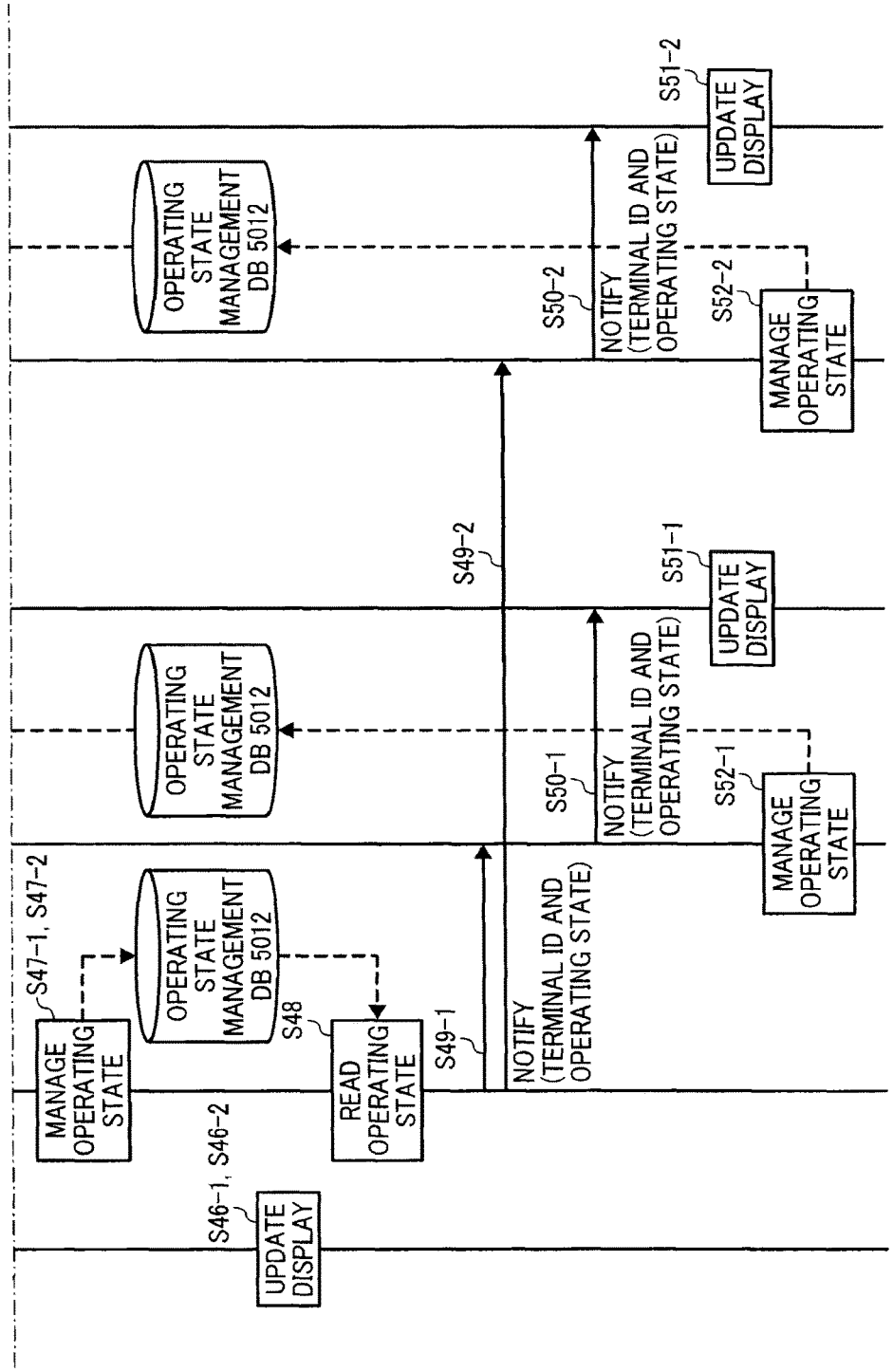

Next, using FIGS. 12A and 12B (FIG. 12), as an example of inter-node cooperation, an operation of synchronizing, among the control apparatuses (50x, 50y, and 50z) included in the control system 5, the operating state of each terminal 10 managed by the control apparatuses (50x, 50y, and 50z)

will be described. FIG. 12 is a sequence diagram illustrating an operation of synchronizing operating states among the control apparatuses 50.

When a terminal 10 (terminal 10aa in this case) logs in to a control apparatus 50 (control apparatus 50x in this case), the searcher 54 of the control apparatus 50x searches for a node that is a terminal 10 serving as a candidate counterpart terminal (terminals (10bb and 10cc) in this case) (step S41-1 and S41-2). This node search is an operation executed to detect to which control apparatus 50 a terminal 10 serving as a candidate counterpart terminal that is not connected to the local control apparatus 50 is connected. Therefore, the node search is executed on, among terminals 10 serving as candidate counterpart terminals, a terminal 10 that is not connected to the local control apparatus 50.

For simplicity, in this disclosure, from the viewpoint of a specific user, the control apparatus 50 that the terminal 10 operated by that user connects may be referred to as a local control apparatus 50 for that terminal 10. In this disclosure, however, the term "local" does not restrict a physical or a network site where the control apparatus 50 is located, but the term "local" is used to specify one control apparatus 50 that connects to the terminal 10 operated by the user, rather than generally referring to an arbitrary control apparatus 50. Moreover, while the control apparatus 50 is illustrated as one apparatus, one or more apparatus may together function as the control apparatus 50, such that a number of apparatuses or devices is not restricted to one as long as the control apparatus 50 operates as a server.

In the case of executing the node search, on the basis of a request from the searcher 54, the transmitter/receiver 51 of the control apparatus 50x transmits search information for the node search to the other control apparatuses (50y and 50z) (steps S41-1 and S41-2). The search information includes the terminal ID of the terminal 10aa connected to the local control apparatus 50x, and the terminal IDs of terminals (10bb and 10cc) serving as candidate counterpart terminals that are not connected to the local control apparatus 50x.

Upon receipt of the search information by the transmitter/receiver 51 of each of the control apparatuses (50y and 50z), each session control 58 determines whether terminals (10bb and 10cc) identified by the terminal IDs included in the search information are connected to the local control apparatus (steps S42-1 and S42-2). A publicly known method is used as the method of determining connection with each terminal 10, though the method is not particularly limited. For example, the method may be one that determines whether each terminal 10 is connected, on the basis of whether a time exceeding a certain threshold has passed since the last reception of information that is periodically sent from the terminal 10 in the session sei. In the case where each session control 58 determines that the terminals (10bb and 10cc) identified by the terminal IDs are not connected to the local control apparatus (NO in steps S42-1 and S42-2), these control apparatuses 50y and 50z do not respond to the control apparatus 50x that is the search information sender, and ends the operation. Hereinafter, the case where each session control 58 determines that one of the terminals (10bb and 10cc) identified by the terminal IDs is connected to the local control apparatus (YES in steps S42-1 and S42-2) will be continuously described.

The data processor 59 of each of the control apparatuses (50y and 50z) reads out, from the operating state management table (see FIG. 9F), an operating state corresponding to the terminal ID of a terminal (10bb or 10cc) connected to the local control apparatus, among the terminals 10 serving as candidate counterpart terminals included in the search information (steps S43-1 and S43-2).

Next, the transmitter/receiver 51 of each of the control apparatuses (50y and 50z) transmits, as a response to the search information, a notification including the terminal ID of a terminal (10bb or 10cc) connected to the local control apparatus, and the operating state read out in step S42-1 or S43-2, to the control apparatus 50x (steps S44-1 and S44-2). Upon receipt of each notification by the transmitter/receiver 51 of the control apparatus 50x, the searcher 54 identifies a control apparatus 50 that is the notification sender as a connection destination of a terminal (10bb or 10cc) identified by the terminal ID included in the notification. Next, the transmitter/receiver 11 transmits each received notification to the terminal 10aa, which has logged in (steps S45-1 and S45-2). Upon receipt of the notifications by the transmitter/receiver 11 of the terminal 10aa, the display control 17 updates icons indicating the operating states of the terminals (10bb and 10cc) serving as candidate counterpart terminals in the candidate list (see FIG. 3), on the basis of the terminal IDs and operating states of the candidate counterpart terminals (10bb and 10cc) included in the respective notifications (steps S46-1 and S46-2).

In contrast, in the control apparatus 50x, on the basis of a request from the manager 53, the data processor 59 stores the operating states included in the notifications transmitted from the control apparatuses (50y and 50z), in association with the terminal IDs of the terminals (10bb and 10cc) included in the notifications, in the operating state management table of the control apparatus 50x (steps S47-1 and S47-2). Accordingly, the control apparatus 50x can detect the operating state of each terminal (10bb and 10cc) serving as a candidate counterpart terminal of the terminal 10aa connected to the control apparatus 50x.

In addition, the data processor 59 of the control apparatus 50x reads out, from the operating state management table, an operating state corresponding to the terminal ID of the terminal 10aa connected to the control apparatus 50x (step S48). The transmitter/receiver 51 of the control apparatus 50x transmits a notification including the terminal ID of the terminal 10aa and the operating state read out in step S48 to the control apparatuses (50y and 50z) that are connection destinations of the terminals (10bb and 10cc) serving as candidate counterpart terminals (step S49-1 and S49-2). Upon receipt of the notification by the transmitter/receiver 51 of each control apparatus (50y and 50z), the transmitter/receiver 51 transmits the received notification to a corresponding terminal (10bb or 10cc) connected to the local control apparatus (steps S50-1 and S50-2). Upon receipt of the notification by the transmitter/receiver 11 of the terminal (10bb or 10cc), the display control 17 updates an icon indicating the operating state of the terminal 10aa in the candidate list, on the basis of the terminal ID and operating state of the terminal 10aa, included in the notification (steps S51-1 and S51-2).

In each of the control apparatuses (50y and 50z), on the basis of a request from the manager 53, the data processor 59 updates the operating state of the terminal 10aa in the operating state management table in the local control apparatus, on the basis of the notification transmitted from the control apparatus 50x (step S52-1 or S52-2). Accordingly, each of the control apparatuses (50y and 50z) can detect the operating state of the terminal 10aa connected to the control apparatus 50x.

Whenever the operating state of a terminal 10 connected to a local control apparatus 50 is updated, each control apparatus 50 and each terminal 10 repeat the operation in steps S43-1 to S47-1, the operation in steps S43-2 to S47-2, or the operation in steps S48 to S52-1 and S52-2. Accordingly, each control apparatus 50, each terminal 10, or the user of each terminal 10 can detect the most recent operating state of each terminal 10.

(Establishment of Session Sed)

Next, using FIGS. 13A and 13B (FIG. 13), an operation of transmitting information between terminals 10 for establishing a session sed will be described. FIG. 13 is a sequence diagram illustrating an operation of transmitting information between terminals 10. Hereinafter, the case where the terminal 10aa connected to the control apparatus 50x sends a communication start request to the terminal 10bb connected to the control apparatus 50y will be described.

In response to operation of the operation keys 108 by the user, the transmitter/receiver 11 of the terminal 10aa transmits a communication start request to the control apparatus 50x (step S61). The communication start request includes the terminal ID "01aa" of the terminal 10aa, which is the communication start request sender, and the terminal ID "01bb" of the terminal 10bb serving as a counterpart terminal.

Upon receipt, by the transmitter/receiver 51 of the control apparatus 50x, of the start request, the data processor 59 stores, on the basis of a request from the manager 53, the operating state "online (communicating)" in association with the terminal ID of the terminal 10aa, which is the start request sender, in the operating state management table (see FIG. 9F) (step S62). The updated operating state "online (communicating)" is reported to a terminal(s) 10 serving as a candidate counterpart terminal(s) of the terminal 10aa by the processing in above-described steps S48 to S51-1 and S51-2.

In addition, the manager 53 manages the communication state of each terminal 10 in accordance with the rules of the state transition illustrated by the state transition diagram of FIG. 2 (step S63-1). That is, on the basis of the start request received by the control apparatus 50x in step S61, the manager 53 determines state information indicating the new state of the terminal 10aa, which is the start request sender, as "Inviting", and determines state information indicating the new state of the terminal 10bb, which is the counterpart terminal, as "Invited". The manager 53 transmits to the shared management apparatus 60 a terminal management table updating request including the items of state information "Inviting" and "Invited" indicating the new states of the terminals (10aa and 10bb), which are the start request sender and the counterpart terminal, in association with the terminal IDs of the terminals (10aa and 10bb).

Upon receipt, by the transmitter/receiver 61 of the shared management apparatus 60, of the updating request, the data processor 69 associatively stores the terminal IDs and the items of state information, which are included in the updating request, in the terminal management table (see FIG. 9B) on the shared management apparatus 60 side. Thereafter, by executing the same processing as steps S8-2-1, S8-2- . . . , the terminal management table on each control apparatus (50x, 50y, and 50z) side is synchronized with the terminal management table on the shared management apparatus 60 side (steps S63-2-1, S63-2-2, S63-2- . . . in FIG. 13B).

Next, the session control 58 selects a relay device 30 that serves as the origin in a session sed, from the relay devices (30xx and 30yy) connected to the terminals (10aa and 10bb) (step S64). In a session sed to be established between the terminals (10aa and 10bb), the two relay devices (30xx and 30yy) relay content data. Out of the relay devices (30xx and 30yy), a relay device 30 selected in step S64 manages the entirety of a relay destination (counterpart terminal) of content data in a session between nodes (terminals 10 or relay devices 30). That is, the selected relay device 30 serves as the origin to provide the other relay device(s) 30 with information indicating a relay destination of content data. The method of selecting a relay device 30 in step S64 is not particularly limited. In the embodiment, the description will be continuously given, assuming that the relay device 30xx to which the terminal 10aa that is the start request sender is connected is selected.

Next, the manager 53 manages information regarding a session sed to be established between the terminals (10aa and 10bb) (step S65-1). At first, the manager 53 generates a session ID for identifying a session sed to be established between the terminals (10aa and 10bb). In this case, the manager 53 generates a session ID (such as "conf01.001xx") including information (such as "001xx") indicating the relay device 30xx serving as the origin, selected in step S64. Next, on the basis of a request from the manager 53, the transmitter/receiver 61 of the shared management apparatus 60 transmits, to the shared management apparatus 60, a request for updating the session management table (see FIG. 9D), including the generated session ID, and the terminal IDs of the terminals (10aa and 10bb), which are the start request sender and the counterpart terminal.

Upon receipt, by the transmitter/receiver 61 of the shared management apparatus 60, of the updating request, the data processor 69 associatively stores the session ID and the terminal IDs, which are included in the updating request, in the session management table on the shared management apparatus 60 side. Thereafter, the transmitter/receiver 61 transmits the updated details of the session management table to the control apparatuses (50x, 50y, and 50z) included in the communication system 1. Upon receipt of the updated details by the transmitter/receiver 51 of each control apparatus (50x, 50y, and 50z), the data processor 59 of each control apparatus 50 updates the session management table therein on the basis of the updated details. Accordingly, the session management table on each control apparatus (50x, 50y, and 50z) side is synchronized with the session management table on the shared management apparatus 60 side (steps S65-2-1, S65-2- . . . ).

In addition, the transmitter/receiver 51 of the control apparatus 50x transmits the session ID, generated in step S65-1, to the terminal 10aa, which is the start request sender (step S66). Furthermore, the transmitter/receiver 51 of the control apparatus 50x transmits the start request, transmitted from the terminal 10aa, which is the start request sender, and the above-mentioned session ID to the terminal 10bb, which is the counterpart terminal (step S67). Note that the terminal management table (see FIG. 9B) on the control apparatus 50x side is synchronized with the terminal management table on the shared management apparatus 60 side on the basis of the IP address of the terminal 10bb, transmitted from the shared management apparatus 60, and manages the IP address of the terminal 10bb, which is the counterpart terminal. Therefore, the transmitter/receiver 51 of the control apparatus 50x can directly transmit the start request or the like to the terminal 10bb, without sending an inquiry about the IP address to the control apparatus 50y, which is a connection destination of the terminal 10bb, which is the counterpart terminal, or without having the control apparatus 50y therebetween.

Upon receipt, by the transmitter/receiver 11 of the terminal 10bb, which is the counterpart terminal, of the start request, the communication control 13 causes the speaker 115 to output a ringtone. Next, the transmitter/receiver 11 of the terminal 10*bb* transmits ringing information indicating that a ringtone is being output, to the control apparatus 50*y*, which is a connection destination of the terminal 10*bb* (step S68). The ringing information includes the terminal IDs of the terminals (10*aa* and 10*bb*), which are the start request sender and the counterpart terminal.

Upon receipt of the ringing information by the transmitter/receiver 51 of the control apparatus 50*y*, the manager 53 manages the communication state of each terminal 10 in accordance with the rules of the state transition illustrated by the state transition diagram of FIG. 2 (step S69-1). That is, on the basis of the ringing information received by the control apparatus 50*y* in step S68, the manager 53 determines state information indicating the new state of the terminal 10*aa*, which is the start request sender, as "Calling", and determines state information indicating the new state of the terminal 10*bb*, which is the counterpart terminal, as "Ringing". The manager 53 transmits to the shared management apparatus 60 a terminal management table updating request including the items of state information "Calling" and "Ringing" indicating the new states of the terminals (10*aa* and 10*bb*), which are the start request sender and the counterpart terminal, in association with the terminal IDs of the terminals (10*aa* and 10*bb*).

Upon receipt, by the transmitter/receiver 61 of the shared management apparatus 60, of the updating request, the data processor 69 associatively stores the terminal IDs and the items of state information, which are included in the updating request, in the terminal management table (see FIG. 9B) on the shared management apparatus 60 side. Thereafter, by executing the same processing as steps S8-2-1, S8-2- . . . , the terminal management table on each control apparatus (50*x*, 50*y*, and 50*z*) side is synchronized with the terminal management table on the shared management apparatus 60 side (steps S69-2-1, S69-2-2, S69-2- . . . ).

Next, the transmitter/receiver 51 of the control apparatus 50*y* transmits the ringing information, transmitted from the terminal 10*bb*, which is the counterpart terminal, to the terminal 10*aa*, which is the start request sender (step S70). Since the terminal management table (see FIG. 9B) on the control apparatus 50*y* side is synchronized with the terminal management table on the shared management apparatus 60 side on the basis of information transmitted from the shared management apparatus 60, the terminal management table on the control apparatus 50*y* side manages the IP address of the terminal 10*aa*, which is the start request sender. Therefore, the transmitter/receiver 51 of the control apparatus 50*y* can directly transmit the ringing information to the terminal 10*aa*, without sending an inquiry about counterpart terminal information to the control apparatus 50*x*, which is a connection destination of the terminal 10*aa*, or without having the control apparatus 50*x* therebetween.

In contrast, in the terminal 10*bb*, which is the counterpart terminal, upon receipt by the acceptor 12 of a communication start permission on the basis of an input operation performed by the user, the transmitter/receiver 11 transmits start permission information indicating a communication start permission to the control apparatus 50*y*, which is a connection destination of the terminal 10*bb* (step S71). The start permission information includes the terminal IDs of the terminals (10*aa* and 10*bb*), which are the start request sender and the counterpart terminal.

Upon receipt of the start permission information by the transmitter/receiver 51 of the control apparatus 50*y*, the manager 53 determines, on the basis of the received start permission information, items of state information indicating the new states of the terminals (10*aa* and 10*bb*), which are the start request sender and the counterpart terminal, as "Accepted", by executing the same processing as step S69-1. The manager 53 transmits to the shared management apparatus 60 a terminal management table updating request including the items of state information "Accepted" indicating the new states of the terminals (10*aa* and 10*bb*), which are the start request sender and the counterpart terminal (step S72-1).

Upon receipt, by the transmitter/receiver 61 of the shared management apparatus 60, of the updating request, the data processor 69 associatively stores the terminal IDs and the items of state information, which are included in the updating request, in the terminal management table (see FIG. 9B) on the shared management apparatus 60 side. Thereafter, by executing the same processing as steps S8-2-1, S8-2- . . . , the terminal management table on each control apparatus (50*x*, 50*y*, and 50*z*) side is synchronized with the terminal management table on the shared management apparatus 60 side (steps S72-2-1, S72-2-2, S72-2- . . . ).

Next, the transmitter/receiver 51 of the control apparatus 50*y* transmits the start permission information, transmitted from the terminal 10*bb*, which is the counterpart terminal, to the terminal 10*aa*, which is the start request sender, by executing the same processing as step S70 (step S73).

Figure 14B:
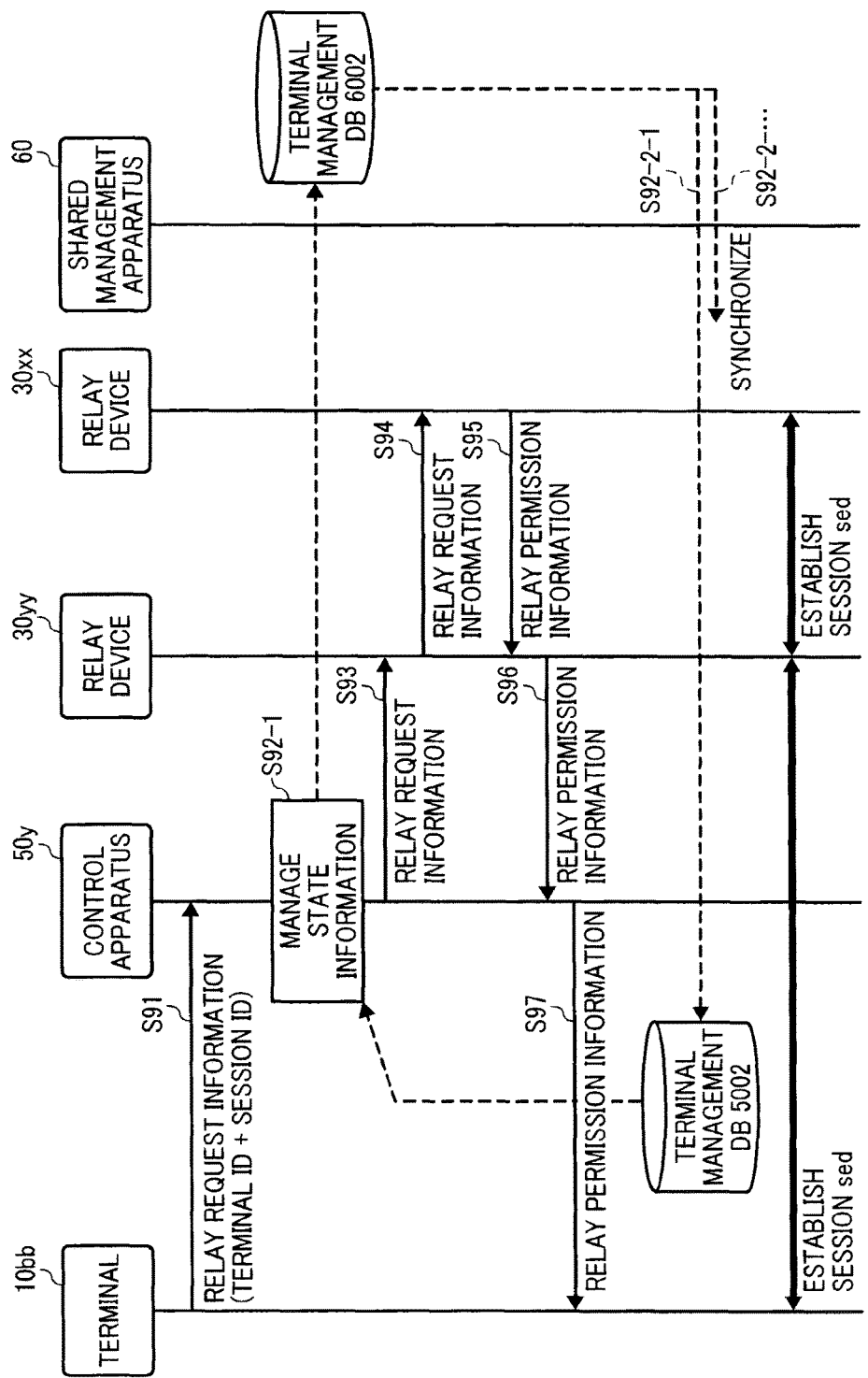

Next, using FIGS. 14A and 14B (FIG. 14), an operation in which the terminals (10*aa* and 10*bb*), which are the start request sender and the counterpart terminal, request the relay devices (30*xx* and 30*yy*), serving as connection destinations of the terminals (10*aa* and 10*bb*), respectively, to start relaying content data will be described. FIGS. 14A and 14B are sequence diagrams illustrating an operation of starting relaying content data.

Using FIG. 14A, an operation of establishing a session sed between the terminal 10*aa* and the relay device 30*xx* in order to start relaying content data between the terminals (10*aa* and 10*bb*) will be described. After having received the start permission information (see step S73), the transmitter/receiver 11 of the terminal 10*aa*, which is the start request sender, transmits to the control apparatus 50*x* relay request information indicating a request for starting relaying content data (step S81). The relay request information includes the terminal ID of the terminal 10*aa*, which is the relay request sender, and the session ID "conf01.001xx" received in step S66.

Upon receipt of the relay request information by the transmitter/receiver 51 of the control apparatus 50*x*, the manager 53 determines, on the basis of the received relay request information, state information indicating the new state of the terminal 10*aa*, which is the relay request sender, as "Busy", by executing the same processing as step S63-1. The manager 53 transmits to the shared management apparatus 60 a terminal management table updating request including the terminal ID of the terminal 10*aa*, which is the relay request sender, and the state information "Busy" indicating the new state of the terminal 10*aa* (step S82-1).

Upon receipt of these items of information by the transmitter/receiver 61 of the shared management apparatus 60, the data processor 69 associatively stores the terminal ID and the state information, which are included in the updating request, in the terminal management table (see FIG. 9B) on the shared management apparatus 60 side. By executing the same processing as steps S8-2-1, S8-2- . . . , the terminal management table on each control apparatus (50*x*, 50*y*, and 50*z*) side is synchronized with the terminal management table on the shared management apparatus 60 side (steps S82-2-1, S82-2 . . . ).

Next, the transmitter/receiver 51 of the control apparatus 50x transmits, on the basis of the relay device ID "001xx" associated with the terminal ID of the terminal 10aa, which is the relay request sender, in the terminal management table (see FIG. 9B) in the control apparatus 50x, the relay request information, transmitted from the terminal 10aa, which is the relay request sender, to the relay device 30xx identified by the relay device ID "001xx" (step S83). In response to the relay request information, the transmitter/receiver 31 of the relay device 30xx transmits relay permission information indicating a relaying permission to the control apparatus 50x (step S84). Upon receipt of the relay permission information transmitted from the relay device 30xx, the transmitter/receiver 51 of the control apparatus 50x transmits the relay permission information to the terminal 10aa, which is the relay request sender (step S85).

Upon receipt of the relay request information by the transmitter/receiver 31 of the relay device 30xx, the relay device 30xx side can detect that the terminal 10aa, which is the relay request sender, will participate in a session identified by the session ID included in the relay request information. Accordingly, the relay device 30xx starts relaying content data transmitted from the terminal 10aa to another terminal 10 participating in the same session as the terminal 10aa, and starts transmitting content data transmitted from this other terminal to the terminal 10aa. In this manner, a session sed is established between the terminal 10aa and the relay device 30xx.

Next, using FIG. 14B, an operation of establishing a session sed between the terminal 10bb and the relay device 30yy and between the relay devices (30xx and 30yy) in order to start relaying content data between the terminals (10aa and 10bb) will be described. After having transmitted the start permission information (see step S71), the transmitter/receiver 11 of the terminal 10bb transmits to the control apparatus 50y relay request information indicating a request for starting relaying content data (step S91). The relay request information includes the terminal ID of the terminal 10bb, which is the relay request sender, and the session ID "conf01.001xx" received in step S67.

Upon receipt of the relay request information by the transmitter/receiver 51 of the control apparatus 50y, the manager 53 determines, on the basis of the received relay request information, state information indicating the new state of the terminal 10bb, which is the relay request sender, as "Busy", by executing the same processing as step S69-1. The manager 53 transmits to the shared management apparatus 60 a terminal management table updating request including the terminal ID of the terminal 10bb, which is the relay request sender, and the state information "Busy" indicating the new state of the terminal 10bb (step S92-1).

Upon receipt, by the transmitter/receiver 61 of the shared management apparatus 60, of the updating request, the data processor 69 associatively stores the terminal ID and the state information, which are included in the updating request, in the terminal management table (see FIG. 9B) on the shared management apparatus 60 side. Thereafter, by executing the same processing as steps S8-2-1, S8-2- . . . , the terminal management table on each control apparatus (50x, 50y, and 50z) side is synchronized with the terminal management table on the shared management apparatus 60 side (steps S92-2-1, S92-2 . . . ).

Next, the transmitter/receiver 51 of the control apparatus 50y transmits, on the basis of the relay device ID "001yy" associated with the terminal ID of the terminal 10bb, which is the relay request sender, in the terminal management table (see FIG. 9B) in the control apparatus 50y, the relay request information, transmitted from the terminal 10bb, which is the relay request sender, to the relay device 30yy identified by the relay device ID "001yy" (step S93). Since the session ID "conf01.001xx" included in the relay request information includes the information "001xx" indicating the relay device 30xx serving as the origin, the relay device 30yy side which has received the relay request information can detect that the relay device 30 serving as the origin in this session sed is the relay device 30xx. Therefore, the transmitter/receiver 31 of the relay device 30yy transmits the relay request information, transmitted from the control apparatus 50y, to the relay device 30xx serving as the origin (step S94).

In response to the relay request information, the transmitter/receiver 31 of the relay device 30xx transmits relay permission information indicating a relaying permission to the relay device 30yy (step S95). In response to the relay request information, the transmitter/receiver 31 of the relay device 30yy transmits relay permission information indicating a relaying permission to the control apparatus 50y (step S96). Upon receipt of the relay permission information transmitted from the relay device 30yy, the transmitter/receiver 51 of the control apparatus 50y transmits the relay permission information to the terminal 10bb, which is the relay request sender (step S97).

Upon receipt of the relay request information by the transmitter/receiver 31 of the relay device 30xx, the relay device 30xx side can detect that the terminal 10bb connected to the relay device 30yy will participate in a session identified by the session ID included in the relay request information. On the basis of to which relay device 30 each terminal 10 participating in the session sed is connected, the relay device 30xx determines a transmission route of content data, and notifies the relay device 30yy thereof. For example, the relay device 30xx transmits to the relay device 30yy a request for transmitting content data transmitted from the terminal 10bb to the relay device 30xx and transmitting content data transmitted from the relay device 30xx to the terminal 10bb. Accordingly, the relay device 30yy starts transmitting content data, transmitted from the terminal 10bb, to the relay device 30xx, and starts transmitting content data of the terminal 10aa, transmitted from the relay device 30xx, to the terminal 10bb. In this manner, a session sed is established between the terminal 10bb and the relay device 30yy and between the relay devices (30xx and 30yy).

When the session sed is established between the terminal 10aa and the relay device 30xx, between the terminal 10bb and the relay device 30yy, and between the relay devices (30xx and 30yy), content data can be transmitted to and from the terminals (10aa and 10bb).

Figure 15B:
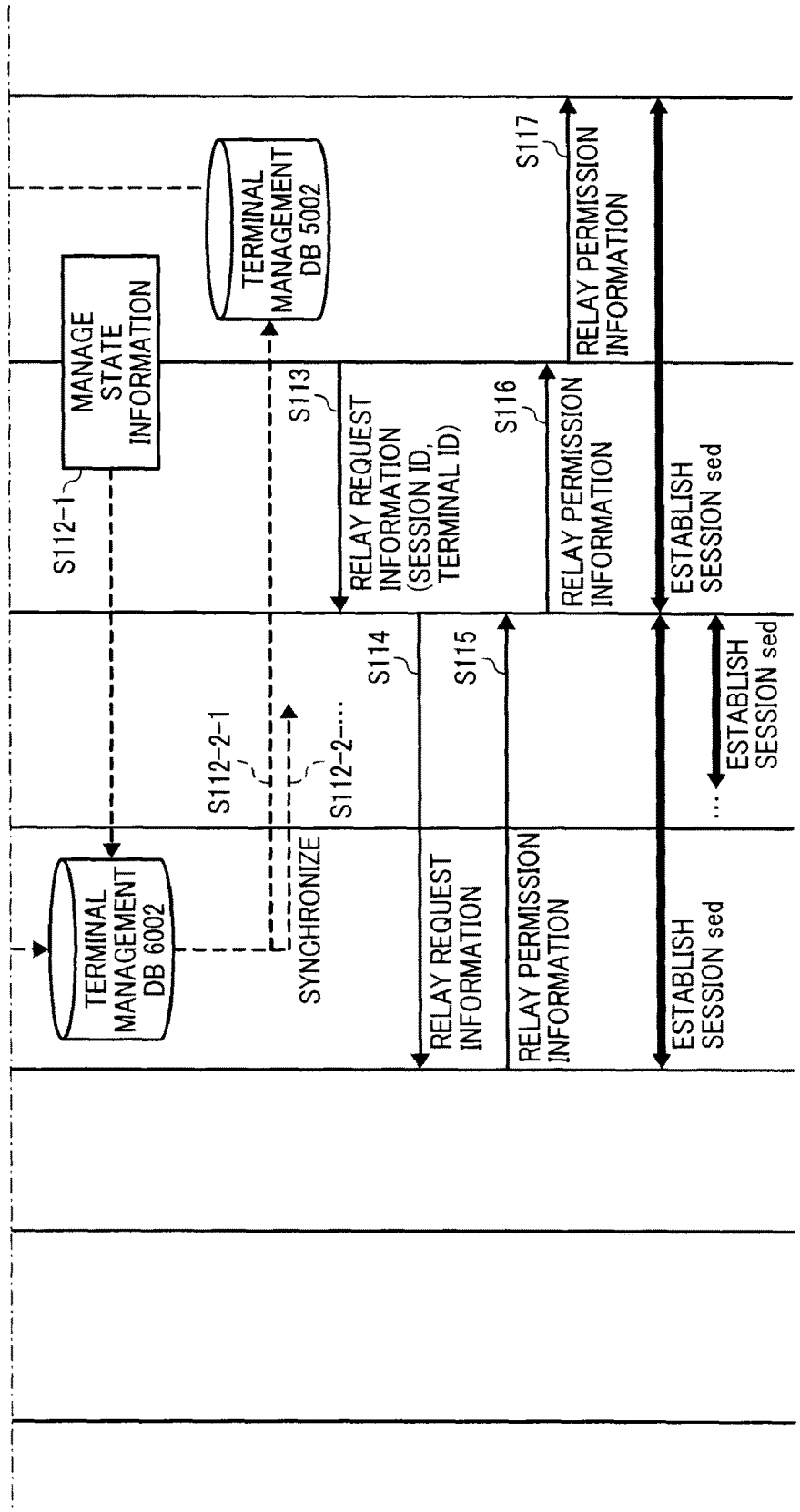

Next, using FIGS. 15A and 15B (FIG. 15), after the session sed is established between the terminal 10aa and the relay device 30xx, between the terminal 10bb and the relay device 30yy, and between the relay devices (30xx and 30yy), an operation where the terminal 10cc connected to the relay device 30zz participates in the above-described session sed will be described. FIG. 15 is a sequence diagram illustrating an operation where the terminal 10cc participates in the session sed.

At first, in the terminal 10aa participating in the session sed, upon receipt by the acceptor 12 of a request from the user for inviting the terminal 10cc to the session sed, the transmitter/receiver 11 transmits invitation information for inviting the terminal 10cc to the session sed, to the control apparatus 50x, which is a connection destination of the terminal 10aa (step S101). The invitation information includes the session ID of the session sed, and the terminal ID of the terminal 10cc to be invited.

Upon receipt of the invitation information transmitted from the terminal 10*aa*, the transmitter/receiver 51 of the control apparatus 50*x* transmits the invitation information to the terminal 10*cc*, on the basis of the terminal ID included in the invitation information (step S102). Note that the terminal management table (see FIG. 9B) on the control apparatus 50*x* side is synchronized with the terminal management table on the shared management apparatus 60 side on the basis of the information transmitted from the shared management apparatus 60, and manages the IP address of the terminal 10*cc*, which is the counterpart terminal. Therefore, the transmitter/receiver 51 of the control apparatus 50*x* can directly transmit the invitation information to the terminal 10*cc*, without sending an inquiry about counterpart terminal information to the control apparatus 50*z*, which is a connection destination of the terminal 10*cc*, or without having the control apparatus 50*z* therebetween.

Upon receipt of the invitation information transmitted from the control apparatus 50*x*, the transmitter/receiver 11 of the terminal 10*cc* transmits, on the basis of a request from the user, participation request information indicating a request for participating in the session sed, which has been invited by the terminal 10*aa* side, to the control apparatus 50*z*, which is a connection destination of the terminal 10*cc* (step S103). The participation request information includes the session ID of the session sed to participate.

Upon receipt of the participation request information by the transmitter/receiver 51 of the control apparatus 50*z*, the manager 53 determines, on the basis of the received participation request information, state information indicating the new state of the terminal 10*cc*, which is the participation request sender, as "Accepted" by executing the same processing as step S63-1. The manager 53 transmits to the shared management apparatus 60 a terminal management table updating request including the terminal ID of the terminal 10*cc*, which is the participation request sender, and the state information "Accepted" indicating the new state of the terminal 10*cc* (step S104-1).

Upon receipt, by the transmitter/receiver 61 of the shared management apparatus 60, of the updating request, the data processor 69 associatively stores the terminal ID and the state information, which are included in the updating request, in the terminal management table (see FIG. 9B) on the shared management apparatus 60 side. By executing the same processing as steps S8-2-1, S8-2- . . . , the terminal management table on each control apparatus (50*x*, 50*y*, and 50*z*) side is synchronized with the terminal management table on the shared management apparatus 60 side (steps S112-2-1, S112-2 . . . ).

Next, the manager 53 manages information regarding the session sed established among the terminals (10*aa*, 10*bb*, and 10*cc*) (step S105-1). In this case, on the basis of a request from the manager 53, the transmitter/receiver 51 transmits, to the shared management apparatus 60, a request for updating the session management table, including the session ID, and the terminal ID of the terminal 10*cc* serving as the participation request sender, which are included in the participation request information.

Upon receipt, by the transmitter/receiver 61 of the shared management apparatus 60, of the updating request, the data processor 69 associatively stores the session ID and the terminal ID, which are included in the updating request, in the session management table (see FIG. 9D) on the shared management apparatus 60 side. Thereafter, by executing the same processing as steps S65-2-1, S65-2, . . . , the session management table on each control apparatus (50*x*, 50*y*, and 50*z*) side is synchronized with the session management table on the shared management apparatus 60 side (steps S105-2- . . . ).

Next, the transmitter/receiver 51 of the control apparatus 50*z* transmits participation permission information indicating a participation permission to the terminal 10*cc*, which is the participation request sender (step S106).

After having received the participation permission information, the transmitter/receiver 11 of the terminal 10*cc*, which is the participation request sender, transmits to the control apparatus 50*z* relay request information indicating a request for starting relaying content data (step S111). The relay request information includes the terminal ID of the terminal 10*cc*, which is the relay request sender, and the session ID "conf01.001xx" received in step S102.

Upon receipt of the relay request information by the transmitter/receiver 51 of the control apparatus 50*z*, the manager 53 determines, on the basis of the received relay request information, state information indicating the new state of the terminal 10*cc*, which is the relay request sender, as "Busy", by executing the same processing as step S63-1. The manager 53 transmits to the shared management apparatus 60 a terminal management table updating request including the terminal ID of the terminal 10*cc*, which is the relay request sender, and the state information "Busy" indicating the new state of the terminal 10*cc* (step S112-1).

Upon receipt, by the transmitter/receiver 61 of the shared management apparatus 60, of the updating request, the data processor 69 associatively stores the terminal ID and the state information, which are included in the updating request, in the terminal management table (see FIG. 9B) on the shared management apparatus 60 side. Next, by executing the same processing as steps S8-2-1, S8-2- . . . , the terminal management table on each control apparatus (50*x*, 50*y*, and 50*z*) side is synchronized with the terminal management table on the shared management apparatus 60 side (steps S112-2-1, S112-2 . . . ).

Next, the transmitter/receiver 51 of the control apparatus 50*z* transmits, on the basis of the relay device ID "001zz" associated with the terminal ID of the terminal 10*cc*, which is the relay request sender, in the terminal management table (see FIG. 9B) in the control apparatus 50*z*, the relay request information, transmitted from the terminal 10*cc*, which is the relay request sender, to the relay device 30*zz* identified by the relay device ID "001zz" (step S113). The relay request information additionally includes the terminal ID of the terminal 10*cc*, which is the participation request sender, in addition to the relay request information sent from the terminal 10*cc*.

Since the session ID "conf01.001xx" included in the relay request information includes the information "001xx" indicating the relay device 30 serving as the origin, the relay device 30*zz* side which has received the relay request information can detect that the relay device 30 serving as the origin in this session sed is the relay device 30*xx*. Therefore, the transmitter/receiver 31 of the relay device 30*zz* transmits the relay request information, transmitted from the control apparatus 50*z*, to the relay device 30*xx* serving as the origin (step S114).

In response to the relay request information, the transmitter/receiver 31 of the relay device 30*xx* transmits relay permission information indicating a relaying permission to the relay device 30*zz* (step S115). In response to the relay request information, the transmitter/receiver 31 of the relay device 30*zz* transmits relay permission information indicating a relaying permission to the control apparatus 50*z* (step S116). Upon receipt of the relay permission information transmitted from the relay device 30zz, the transmitter/receiver 51 of the control apparatus 50z transmits the relay permission information to the terminal 10cc, which is the relay request sender (step S117).

Upon receipt of the relay request information by the transmitter/receiver 31 of the relay device 30xx, the relay device 30xx side can detect that the terminal 10cc connected to the relay device 30zz will participate in a session identified by the session ID included in the relay request information. On the basis of to which relay device 30 each terminal 10 participating in the session sed is connected, the relay device 30xx determines a transmission route of content data, and notifies the relay devices (30zz and 30yy) thereof. For example, the relay device 30xx transmits to the relay device 30zz a request for transmitting content data transmitted from the terminal 10cc to the relay devices (30xx and 30yy) and transmitting content data of the terminals (10aa and 10bb), transmitted from the relay devices (30xx and 30zz), to the terminal 10cc. Accordingly, the relay device 30zz starts transmitting content data, transmitted from the terminal 10cc, to the relay devices (30xx and 30yy), and starts transmitting content data of the terminals 10aa and 10bb, transmitted from the relay devices 30xx and 30yy, to the terminal 10bb.

In addition, the relay device 30xx transmits to the relay device 30yy a request for transmitting content data transmitted from the terminal 10bb to the relay device 30zz and transmitting content data of the terminal 10cc, transmitted from the relay device 30zz, to the terminal 10bb. Accordingly, the relay device 30yy starts transmitting content data, transmitted from the terminal 10bb, to the relay device 30zz, and starts transmitting content data of the terminal 10cc, transmitted from the relay device 30zz, to the terminal 10bb.

In this manner, a session sed is established between the terminal 10cc and the relay device 30zz and between the relay device 30zz and the relay devices (30xx and 30yy). When the session sed is established between the terminal 10cc and the relay device 30zz, and between the relay device 30zz and the relay devices (30xx and 30yy), content data can be transmitted among the terminals (10aa, 10bb, and 10cc).

(Exit from Session Sed)

Next, using FIG. 16A, an operation where the terminal 10aa, which is participating in the session sed established among the terminals (10aa, 10bb, and 10cc), exits from the session sed will be described. FIG. 16A is a sequence diagram illustrating an operation where the terminal 10aa exits from the session sed.

At first, the transmitter/receiver 11 of the terminal 10aa transmits, on the basis of a request from the user, end request information indicating a request for ending communication to the control apparatus 50x (step S121). The end request information includes the session ID "conf01.001xx" of the session sed in which the terminal 10aa is participating.

Upon receipt of the end request information by the transmitter/receiver 51 of the control apparatus 50x, the manager 53 determines, on the basis of the received end request information, state information indicating the new state of the terminal 10aa, which is the end request sender, as "None", by executing the same processing as step S63-1. The manager 53 transmits to the shared management apparatus 60 a terminal management table updating request including the terminal ID of the terminal 10aa, which is the end request sender, and the state information "None" indicating the new state of the terminal 10aa (step S122-1).

Upon receipt, by the transmitter/receiver 61 of the shared management apparatus 60, of the updating request, the data processor 69 associatively stores the terminal ID and the state information, which are included in the updating request, in the terminal management table (see FIG. 9B) on the shared management apparatus 60 side. By executing the same processing as steps S8-2-1, S8-2- . . . , the terminal management table on each control apparatus (50x, 50y, and 50z) side is synchronized with the terminal management table on the shared management apparatus 60 side (steps S122-2-1, S122-2 . . . ).

Next, the manager 53 manages information regarding the session sed from which the terminal 10aa will exit (step S123-1). In this case, on the basis of a request from the manager 53, the transmitter/receiver 51 transmits, to the shared management apparatus 60, a request for updating the session management table, including the session ID included in the end request information, and the terminal ID of the terminal 10aa, which will exit from the session sed.

Upon receipt, by the transmitter/receiver 61 of the shared management apparatus 60, of the updating request, the data processor 69 deletes the terminal ID of the terminal 10aa, associated with the session ID included in the updating request, from the session management table (see FIG. 9D) on the shared management apparatus 60 side. Thereafter, by executing the same processing as steps S65-2-1, S65-2-, . . . , the session management table on each control apparatus (50x, 50y, and 50z) side is synchronized with the session management table on the shared management apparatus 60 side (steps S123-2- . . . ).

Next, the transmitter/receiver 51 of the control apparatus 50x transmits, on the basis of the relay device ID "001xx" associated with the terminal ID of the terminal 10aa, which is the end request sender, in the terminal management table (see FIG. 9B) in the control apparatus 50x, the end request information, transmitted from the terminal 10aa, which is the end request sender, to the relay device 30xx identified by the relay device ID "001xx" (step S124).

Upon receipt of the end request information by the transmitter/receiver 31 of the relay device 30xx, the relay device 30xx side can detect that the terminal 10aa will exit from the session sed established among the terminals (10aa, 10bb, and 10cc). On the basis of to which relay device 30 each of terminals (10bb and 10cc) participating in the session sed is connected after the terminal 10aa exits from the session sed, the relay device 30xx determines a transmission route of content data, and notifies the relay devices (30yy and 30zz) thereof. For example, the relay device 30xx transmits to the relay device 30yy a request for transmitting content data transmitted from the terminal 10bb to the relay device 30zz and transmitting content data of the terminal 10cc, transmitted from the relay device 30zz, to the terminal 10bb. In addition, the relay device 30xx transmits to the relay device 30zz a request for transmitting content data transmitted from the terminal 10cc to the relay device 30yy, and transmitting content data of the terminal 10bb, transmitted from the relay device 30yy, to the terminal 10cc.

Accordingly, the terminal 10aa is disconnected from the session sed (step S125), while the terminals (10bb and 10cc) can continuously transmit content data to and from each other.

Figure 16B:
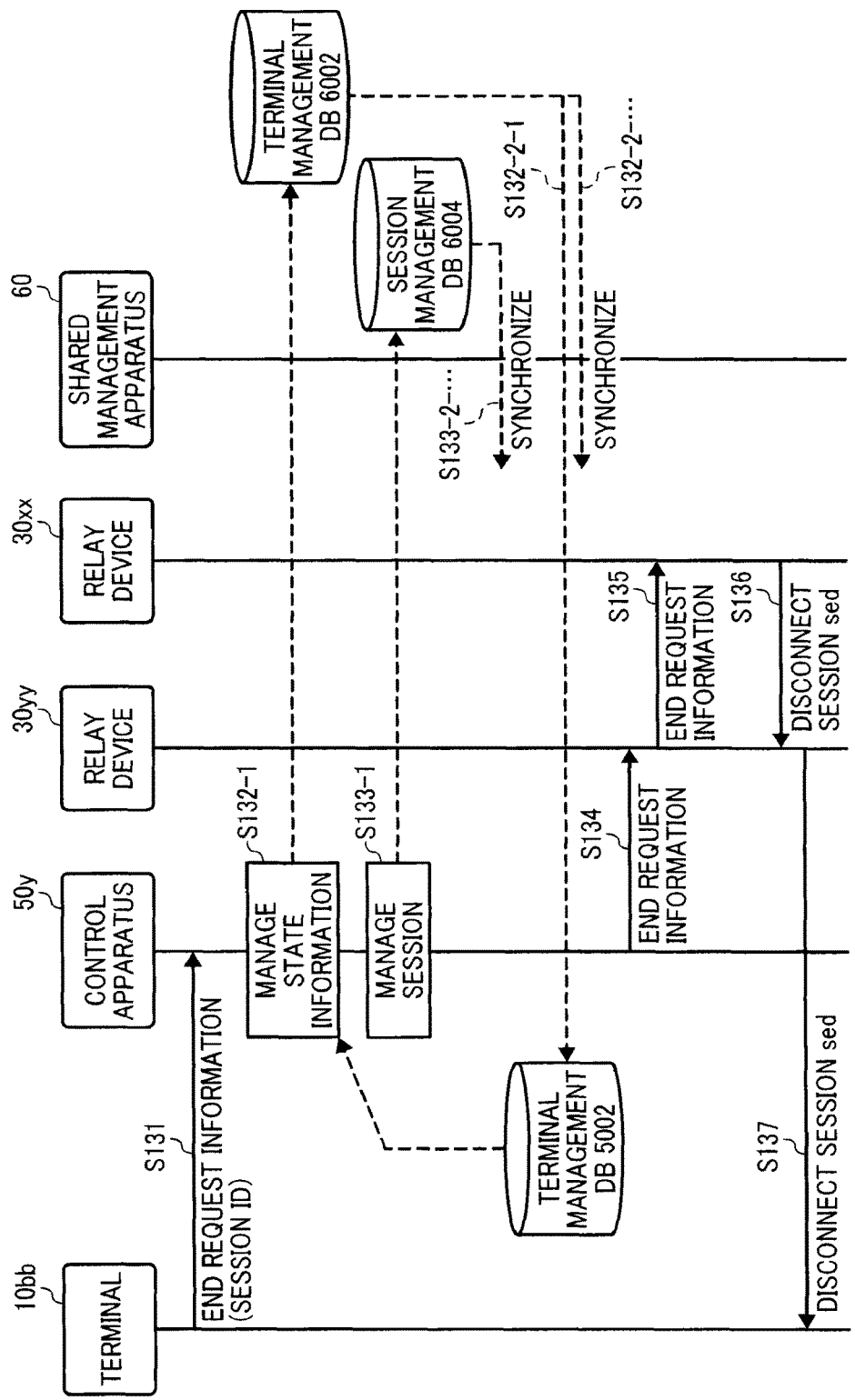

Next, using FIG. 16B, an operation where, after the terminal 10aa exits, the terminal 10bb exits from the session sed established between the terminals (10bb and 10cc) will be described. At first, the transmitter/receiver 11 of the terminal 10bb transmits, on the basis of a request from the user, end request information indicating a request for ending communication to the control apparatus 50y (step S131).

The end request information includes the session ID "conf01.001xx" of the session sed in which the terminal 10*bb* is participating.

Upon receipt of the end request information by the transmitter/receiver 51 of the control apparatus 50*y*, the manager 53 determines, on the basis of the received end request information, state information indicating the new state of the terminal 10*bb*, which is the end request sender, as "None", by executing the same processing as step S63-1. The manager 53 transmits to the shared management apparatus 60 a terminal management table updating request including the terminal ID of the terminal 10*bb*, which is the end request sender, and the state information "None" indicating the new state of the terminal 10*bb* (step S132-1).

Upon receipt, by the transmitter/receiver 61 of the shared management apparatus 60, of the updating request, the data processor 69 associatively stores the terminal ID and the state information, which are included in the updating request, in the terminal management table (see FIG. 9B) on the shared management apparatus 60 side. Thereafter, by executing the same processing as steps S8-2-1, S8-2- . . . , the terminal management table on each control apparatus (50*x*, 50*y*, and 50*z*) side is synchronized with the terminal management table on the shared management apparatus 60 side (steps S132-2-1, S132-2 . . . ).

Next, the manager 53 manages information regarding the session sed from which the terminal 10*bb* will exit (step S133-1). In this case, on the basis of a request from the manager 53, the transmitter/receiver 51 transmits, to the shared management apparatus 60, a request for updating the session management table, including the session ID included in the end request information, and the terminal ID of the terminal 10*bb*, which will exit from the session sed.

Upon receipt, by the transmitter/receiver 61 of the shared management apparatus 60, of the updating request, the data processor 69 deletes the terminal ID of the terminal 10*bb*, associated with the session ID included in the updating request, from the session management table (see FIG. 9D) on the shared management apparatus 60 side. Thereafter, by executing the same processing as steps S65-2-1, S65-2-, . . . , the session management table on each control apparatus (50*x*, 50*y*, and 50*z*) side is synchronized with the session management table on the shared management apparatus 60 side (steps S133-2- . . . ).

Next, the transmitter/receiver 51 of the control apparatus 50*y* transmits, on the basis of the relay device ID "001yy" associated with the terminal ID of the terminal 10*bb*, which is the end request sender, in the terminal management table (see FIG. 9B) in the control apparatus 50*y*, the relay request information, transmitted from the terminal 10*bb*, which is the end request sender, to the relay device 30*yy* identified by the relay device ID "001yy" (step S134). Since the session ID "conf01.001xx" included in the end request information includes the information "001xx" indicating the relay device 30*xx* serving as the origin, the relay device 30*yy* side which has received the relay request information can detect that the relay device 30 serving as the origin in this session sed is the relay device 30*xx*. Therefore, the transmitter/receiver 31 of the relay device 30*yy* transmits the end request information, transmitted from the control apparatus 50*y*, to the relay device 30*xx* serving as the origin (step S135).

Upon receipt of the end request information by the transmitter/receiver 31 of the relay device 30*xx*, the relay device 30*xx* side can detect that the terminal 10*bb* will exit from the session sed established between the terminals (10*bb* and 10*cc*). On the basis of to which relay device 30 the terminal 10*cc* participating in the session sed is connected after the terminal 10*bb* exits from the session sed, the relay device 30*xx* determines a transmission route of content data, and notifies the relay devices (30*yy* and 30*zz*) thereof. For example, the relay device 30*xx* transmits to the relay device 30*yy* a request for disconnecting the session sed with the terminal 10*bb* and with the relay device 30*xx*. In addition, the relay device 30*xx* transmits to the relay device 30*zz* a request for transmitting content data of the terminal 10*cc*, transmitted from the terminal 10*cc*, back to the content data 10*cc*. Accordingly, the terminal 10*bb* is disconnected from the session sed (step S137), while the terminal 10*bb* can continue the session sed for receiving, by itself via the relay device 30*zz*, content data that has been transmitted by itself.

(Log Out Operation)

First, using FIG. 17, an operation where a terminal 10 logs out from a control apparatus 50 will be described. FIG. 17 is a sequence diagram illustrating a logout operation of a terminal 10. Hereinafter, an operation where, after exiting from the session sed with the terminals (10*bb* and 10*cc*), the terminal 10*aa* logs out from the control apparatus 50*x* will be described.

On the basis of a request from the user, the transmitter/receiver 11 of the terminal 10*aa* transmits a logout request to the control apparatus 50*x* (step S141). Upon receipt of the logout request, the transmitter/receiver 51 of the control apparatus 50*x* transmits, on the basis of a request from the manager 53, a request for deleting, from the terminal management table (see FIG. 9B), an area ID, IP address, and relay device ID associated with the terminal ID of the terminal 10*aa* which will log out, to the shared management apparatus 60 (step S142-1).

Upon receipt, by the transmitter/receiver 61 of the shared management apparatus 60, of this request, the data processor 69 deletes an area ID, IP address, and relay device ID associated with the received terminal ID, from the terminal management table (see FIG. 9B) on the shared management apparatus 60 side. Thereafter, by executing the same processing as steps S8-2-1, S8-2- . . . , the terminal management table on each control apparatus (50*x*, 50*y*, and 50*z*) side is synchronized with the terminal management table on the shared management apparatus 60 side (step S142-2 . . . ).

Next, on the basis of a request from the manager 53, the data processor 59 stores the operating state "offline" in association with the terminal ID of the terminal 10*aa*, which is the logout request sender, in the operating state management table (see FIG. 9F) (step S143). The updated operating state "offline" is reported to a terminal(s) 10 serving as a candidate counterpart terminal(s) of the terminal 10*aa* by the processing in above-described steps S48 to S51-1 and S51-2.

In addition, the manager 53 deletes each record where the terminal ID of the terminal 10*aa*, which is the logout request sender, is recorded, from the connection management table (FIG. 9G) of the control apparatus 50*x* (step S144). Accordingly, the terminal ID of the terminal 10*aa*, and a relay device connection ID and a relay device connection password that are associated with this terminal ID are deleted from the connection management table.

Next, the transmitter/receiver 51 of the control apparatus 50*x* transmits logout completion information indicating that logout has been completed to the terminal 10*aa*, which is the logout request sender (step S145).

In addition, the terminal 10*aa* transmits a logout request to the relay device 30*xx* (step S146). Upon completion of operation involved in logging out of the terminal 10*aa*, the relay device 30*xx* transmits logout completion information to the terminal 10*aa* (step S147).

With the above operation, the terminal 10aa completely logs out from the control apparatus 50x and the relay device 30xx.

The control system 5 includes a plurality of control apparatuses 50 each capable of controlling a session sed for transmitting content data between at least two terminals 10 of a first terminal 10 and a second terminal 10. In establishing a session sed for transmitting content data through a plurality of relay devices, the session control 58 determines one of the plurality of relay devices 30, as a representative relay device (referred to as the origin relay device in the above description) to manage a relay destination of content data in the session sed (See S64) when established.

In response to a request for starting relay of content data through the session sed from a terminal 10, the transmitter/receiver 51 (an example of transmitter) transmits, with the request for starting relay of content data, a relay device ID (an example of identification information) of the representative relay device to at least one relay device 30 that connects to the requesting terminal 10. The relay device 30 that receives the representative relay device ID is caused to further transmit the request to the representative relay device identified with the received representative relay device ID. For example, if the relay device 30 receiving the representative relay device ID is the representative relay device 30 itself, the representative relay device 30 does not transmit the representative relay device ID to any other relay device 30. If the relay device 30 receiving the representative relay device ID is the relay device 30 other than the representative relay device, the relay device 30 transmits the representative relay device ID to the representative relay device 30.

Accordingly, each relay device 30 is notified of the representative relay device 30, which manages the session to be established for relaying content data, such that the each relay device 30 is able to send the request for starting relay of content data to the representative relay device 30.

The representative relay device 30 that manages a relay destination of content data, which receives notification from the relay device 30 connected to the requesting terminal 10, is able to determine a route of transmitting content data to the requesting terminal 10. Even in a case where the requesting terminal 10 is connected to the relay device 30, which is not accessible by the control apparatus 50, the representative relay device 30 is able to transmit content data to the requesting terminal 10 through the relay device 30, as the relay device 30 accesses the representative relay device 30 using the representative relay device ID.

The request for starting relay of content data may be transmitted from any other terminal 10, which may be newly invited to join in the session that is established. In such case, the terminal 10 participating in the session, which receives the representative relay device ID from the control apparatus 50, sends invitation to the other terminal 10 with the representative relay device ID. The other terminal 10 sends a request for starting relay of content data with the representative relay device ID, to a control apparatus 50 managing the other terminal 10. The control apparatus 50 sends the representative relay device ID to a relay device 30 connected to the other terminal 10 that requests for relaying content data. The relay device 30 transmits the request for relaying content data to the representative relay device 30, which is identified with the received representative relay device ID. The representative relay device 30 that manages a relay destination of content data, which receives notification from the relay device 30 connected to the requesting other terminal 10, is able to determine a route of transmitting content data to the requesting other terminal 10.

The above-described embodiment has discussed the case where the relay device ID of the representative relay device 30 (origin relay device 30) for managing a relay destination of content data, is included as a part of the session ID of the session. However, the present invention is not limited to the above-described embodiment. For example, as long as the relay device ID of the representative relay device 30 is associated with the session ID, these data may be independently managed. In such case, the session management table (FIG. 9D) stores the session ID and the relay device ID in separate fields, but in association with each other. Further, each one of the terminal 10, the control apparatus 50, and the relay device 30 transmits the session ID and the relay device ID in association with one another, to the other terminal 10, control apparatus 50, or relay device 30.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC) and conventional circuit components arranged to perform the recited functions.

The present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any storage medium for storing processor readable code such as a floppy disk, hard disk, CD ROM, magnetic tape device or solid state memory device.

The hardware platform includes any desired kind of hardware resources including, for example, a central processing unit (CPU), a random access memory (RAM), and a hard disk drive (HDD). The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

The invention claimed is:

1. A control system, comprising:
  a first control apparatus including:
    processing circuitry configured to obtain information regarding a plurality of relay devices for relaying content data in a session to be established among a plurality of communication terminals, and determine one of the plurality of relay devices as a representative relay device to manage a relay destination of content data in the session to be established; and a transmitter configured to transmit relay device identification information for identifying the representative relay device to the plurality of communication terminals subject for participation in the session; and a second control apparatus including:

a receiver configured to receive, from a first communication terminal of the plurality of communication terminals subject for participation in the session, a request for starting relay of content data including the relay device identification information of the representative relay device; and a transmitter configured to transmit, with the request for starting relay of content data, the relay device identification information of the representative relay device to a first relay device connected to the first communication terminal, to cause the first relay device to further transmit the request for starting relay of content data to the representative relay device identified with the relay device identification information of the representative relay device.

2. The control system of claim 1, further comprising:

a third control apparatus including;

a receiver configured to receive, from a second communication terminal, an other request for starting relay of content data including the relay device identification information of the representative relay device, the second communication terminal being a terminal other than the plurality of communication terminals subject for participation in the session; and a transmitter configured to transmit the other request for starting relay of content data to a second relay device connected to the second communication terminal, to cause the second relay device to further transmit the other request for starting relay of content data to the representative relay device identified with the relay device identification information of the representative relay device.

3. The control system of claim 1, wherein the transmitter of the first control apparatus transmits the relay device identification information of the representative relay device to the plurality of communication terminals subject for participation in the session, as a session identification for identifying the session to be established among the plurality of communication terminals.

4. The control system of claim 3, wherein the processing circuitry of the first control apparatus generates the session identification for identifying the session to be established, so as to contain the relay device identification information of the representative relay device.

5. A control apparatus, comprising:

processing circuitry configured to obtain information regarding a plurality of relay devices for relaying content data in a session to be established among a plurality of communication terminals, and determine one of the plurality of relay devices as a representative relay device to manage a relay destination of content data in the session to be established;

a receiver configured to receive, from a first communication terminal of the plurality of communication terminals subject for participation in the session, a request for starting relay of content data; and a transmitter configured to transmit, with the request for starting relay of content data, relay device identification information for identifying the representative relay device to a first relay device connected to the first communication terminal, to cause the first relay device to further transmit the request for starting relay of content data to the representative relay device identified with the relay device identification information of the representative relay device.

6. The control apparatus of claim 5, wherein the receiver further receives, from a second communication terminal, an other request for starting relay of content data including the relay device identification information of the representative relay device, the second communication terminal being a terminal other than the plurality of communication terminals subject for participation in the session, and the transmitter further transmits the other request for starting relay of content data to a second relay device connected to the second communication terminal, to cause the second relay device to further transmit the other request for starting relay of content data to the representative relay device identified with the relay device identification information of the representative relay device.

7. The control apparatus of claim 5, wherein the transmitter further transmits the relay device identification information of the representative relay device to the plurality of communication terminals subject for participation in the session, before establishing the session in response to the request for starting relay of content data.

8. The control apparatus of claim 7, wherein the receiver receives the relay device identification information of the representative relay device from the first communication terminal, with the request for starting relay of content data, wherein the transmitter transmits, to the first relay device, the relay device identification information of the representative relay device that is received from the first communication terminal.

9. The control apparatus of claim 8, wherein the processing circuitry generates session identification information for identifying the session to be established among the plurality of communication terminals, and transmits the session identification information to the plurality of communication terminals subject for participation in the session, the session identification information including the relay device identification information of the representative relay device.

10. The control apparatus of claim 9, further comprising:

a memory configured to store the session identification information including the relay device identification information of the representative relay device, in association with identification information for identifying each one of the plurality of communication terminals participating in the session.

11. A method of controlling a session, comprising:

obtaining information regarding a plurality of relay devices for relaying content data in a session to be established among a plurality of communication terminals, and determine one of the plurality of relay devices as a representative relay device to manage a relay destination of content data in the session to be established;

receiving, from a first communication terminal of the plurality of communication terminals subject for participation in the session, a request for starting relay of content data; and transmitting, with the request for starting relay of content data, relay device identification information for identifying the representative relay device to a first relay device connected to the first communication terminal, to cause the first relay device to further transmit the request for starting relay of content data to the representative relay device identified with the relay device identification information of the representative relay device.

12. The method of claim 11, further comprising:

receiving, from a second communication terminal, an other request for starting relay of content data including the relay device identification information of the representative relay device, the second communication terminal being a terminal other than the plurality of communication terminals subject for participation in the session; and transmitting the other request for starting relay of content data to a second relay device connected to the second communication terminal, to cause the second relay device to further transmit the other request for starting relay of content data to the representative relay device identified with the relay device identification information of the representative relay device.

13. The method of claim 11, further comprising:

transmitting the relay device identification information of the representative relay device to the plurality of communication terminals subject for participation in the session, before establishing the session in response to the request for starting relay of content data.

14. The method of claim 13, further comprising:

receiving the relay device identification information of the representative relay device from the first communication terminal, with the request for starting relay of content data; and transmitting, to the first relay device, the relay device identification information of the representative relay device that is received from the first communication terminal.

15. The method of claim 14, further comprising:

generating session identification information for identifying the session to be established among the plurality of communication terminals; and transmitting the session identification information to the plurality of communication terminals subject for participation in the session, the session identification information including the relay device identification information of the representative relay device.

* * * * *